US010754692B2

(12) United States Patent
Lee

(10) Patent No.: US 10,754,692 B2
(45) Date of Patent: Aug. 25, 2020

(54) MEMORY CONTROLLER AND OPERATING METHOD THEREOF

(71) Applicant: SK hynix Inc., Gyeonggi-do (KR)

(72) Inventor: Joo Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/207,424

(22) Filed: Dec. 3, 2018

(65) Prior Publication Data

US 2019/0332436 A1    Oct. 31, 2019

(30) Foreign Application Priority Data

Apr. 26, 2018    (KR) .................. 10-2018-0048747

(51) Int. Cl.
*G06F 3/06* (2006.01)
*G06F 9/50* (2006.01)
(Continued)

(52) U.S. Cl.
CPC .......... *G06F 9/5016* (2013.01); *G06F 3/0679* (2013.01); *G06F 12/0246* (2013.01); *G06F 12/0646* (2013.01)

(58) Field of Classification Search
CPC ............. G06F 12/0246; G06F 12/0646; G06F 3/0679; G06F 3/383; G06F 3/3838; G06F 3/3867; G06F 3/3851; G06F 3/3885
See application file for complete search history.

(56) References Cited

U.S. PATENT DOCUMENTS 5,682,513 A * 10/1997 Candelaria .......... G06F 11/2064
    711/113
6,098,148 A *  8/2000 Carlson .................. G06F 3/0613
    711/100
(Continued)

FOREIGN PATENT DOCUMENTS

KR    1020150055884    5/2015
KR    101687762    1/2017

OTHER PUBLICATIONS

Joon-Young Paik, Tae-Sun Chung, Eun-Sun Cho, Dynamic Allocation Mechanism to Reduce Read Latency in Collaboration With a Device Queue in Multichannel Solid-State Devices. IEEE Transactions on Computer-Aided Design of Integrated Circuits and Systems, vol. 36, No. 4, Apr. 2017 (Year: 2017).*

(Continued)

*Primary Examiner* — Khoa D Doan
(74) *Attorney, Agent, or Firm* — IP & T Group LLP

(57) ABSTRACT

There are provided a memory controller and an operating method thereof. The memory controller includes a host interface layer for receiving a host program request and a host read request, a flash translation layer for generating and outputting a program command and a plurality of program addresses in response to the host program request, checking a program progress state for a program address corresponding to a target read address when the target read address corresponding to the host read request is included in the program addresses, and controlling a read operation on the target read address according to whether a program operation on the program address corresponding to the target read address has been completed, and a flash interface layer for transmitting a command and addresses, which are output from the flash translation layer, to a memory device.

15 Claims, 15 Drawing Sheets

(51) Int. Cl.
*G06F 12/06* (2006.01)
*G06F 12/02* (2006.01)

(56) References Cited

U.S. PATENT DOCUMENTS

| | | | | |
|---|---|---|---|---|
| 6,259,740 B1* | 7/2001 | Lyu | .................. | H04N 21/23406 375/240.25 |
| 6,314,478 B1* | 11/2001 | Etcheverry | ............... | G06F 5/10 358/1.14 |
| 8,468,319 B1* | 6/2013 | Satran | .................... | G06F 3/0689 711/111 |
| 10,282,250 B1* | 5/2019 | Banerjee | ............. | G06F 11/1004 |
| 10,409,511 B1* | 9/2019 | Subbarao | ............. | G06F 3/0607 |
| 10,521,383 B1* | 12/2019 | Adams | .................... | G06F 3/061 |
| 2004/0068614 A1* | 4/2004 | Rosenbluth | ......... | G06F 13/1642 711/133 |
| 2005/0033907 A1* | 2/2005 | Bombal | .................... | G06F 5/14 711/104 |
| 2006/0179185 A1* | 8/2006 | Daly, Jr. | ............. | G06F 12/0815 710/39 |
| 2007/0079044 A1* | 4/2007 | Mandal | ................. | G06F 13/404 710/310 |
| 2009/0070547 A1* | 3/2009 | Jeong | .................. | G06F 12/0246 711/209 |
| 2009/0235113 A1* | 9/2009 | Shaeffer | ............. | G06F 11/1004 714/5.11 |
| 2009/0282188 A1* | 11/2009 | Son | .................... | G06F 12/0246 711/103 |
| 2010/0082890 A1* | 4/2010 | Heo | .................... | G06F 12/0246 711/103 |
| 2013/0205085 A1* | 8/2013 | Hyun | ..................... | G11C 16/10 711/114 |
| 2013/0311609 A1* | 11/2013 | Kragh | ................. | H04L 49/9047 709/217 |
| 2014/0304459 A1* | 10/2014 | Kim | .................... | G11C 16/0483 711/103 |
| 2015/0046605 A1* | 2/2015 | Barrell | .................. | G06F 3/0659 710/5 |
| 2015/0124525 A1* | 5/2015 | Kim | ....................... | G11C 16/26 365/185.03 |
| 2015/0347314 A1* | 12/2015 | Lee | ..................... | G06F 12/1009 711/103 |
| 2016/0085465 A1* | 3/2016 | Schmier | ................ | G06F 3/0619 711/103 |
| 2016/0133329 A1* | 5/2016 | Moon | .................... | G11C 16/14 365/185.11 |
| 2016/0378659 A1* | 12/2016 | Gschwind | ............ | G06F 9/3859 711/135 |
| 2019/0286338 A1* | 9/2019 | Noda | .................... | G06F 3/0679 |
| 2019/0317901 A1* | 10/2019 | Kachare | ................ | G06F 3/0659 |

OTHER PUBLICATIONS

Wang Menglei, Shi Yang and Qiao Lufeng, "FPGA Design of onboard queue management equipment based on occupancy," Proceedings 2011 International Conference on Transportation, Mechanical, and Electrical Engineering (TMEE), Changchun, 2011, pp. 1111-1114. (Year: 2011).*

* cited by examiner

MEMORY CONTROLLER AND OPERATING METHOD THEREOF

CROSS-REFERENCE TO RELATED APPLICATION

The present application claims priority under 35 U.S.C. § 119(a) to Korean patent application number 10-2018-0048747, filed on Apr. 26, 2018, the disclosure of which is incorporated herein by reference in its entirety.

BACKGROUND

Field of Invention

Various embodiments of the present disclosure generally relate to a memory controller. Particularly, the embodiments relate to a memory controller capable of controlling a read operation, based on a progress state of a program operation, and an operating method of the memory controller.

Description of Related Art

A memory system may include a storage device and a memory controller.

The storage device may include a plurality of memory devices, and the memory devices may store data or output stored data. For example, the memory devices may be configured as volatile memory devices in which stored data is lost when the supply of power is interrupted, or be configured as nonvolatile memory devices in which stored data is retained even when the supply of power is interrupted.

The memory controller may control data communication between a host and the storage data.

The host may communicate with the storage device through the memory controller by using an interface protocol such as Peripheral Component Interconnect-Express (PCI-e or PCIe), Advanced Technology Attachment (ATA), Serial ATA (SATA), Parallel ATA (PATA), or Serial Attached SCSI (SAS). Interface protocols between the host and the memory system are not limited to the above-described examples, and may include various interfaces such as a Universal Serial Bus (USB), a Multi-Media Card (MMC), an Enhanced Small Disk Interface (ESDI), and Integrated Drive Electronics (IDE).

SUMMARY

Embodiments provide a memory controller capable of controlling a read operation, based on a progress state of a program operation, and an operating method of the memory controller.

According to an aspect of the present disclosure, there is provided an operating method of a memory controller, the method including transmitting a program command and a plurality of program addresses to a memory device in response to a host program request, checking, when a target read address corresponding to a host read request is included in the program addresses, a program progress state for a program address corresponding to the target read address among the program addresses, and controlling a read operation on the target read address according to whether a program operation on the program address corresponding to the target read address has been completed.

According to another aspect of the present disclosure, there is provided a memory controller including a host interface layer configured to receive a host program request and a host read request, a flash translation layer configured to generate and output a program command and a plurality of program addresses in response to the host program request, check a program progress state for a program address corresponding to a target read address when the target read address corresponding to the host read request is included in the program addresses, and control a read operation on the target read address according to whether a program operation on the program address corresponding to the target read address has been completed, and a flash interface layer configured to transmit a command and addresses, which are output from the flash translation layer, to a memory device.

According to still another aspect of the present disclosure, there is provided a memory controller including a first index storage configured to store an address at which a program operation is completed among a plurality of addresses corresponding to a host program request, a second index storage configured to store a start address to be used in a next host program request, and a host request processor configured to control a read operation corresponding to a host read request according to whether a target read address corresponding to the host read request is located between the address stored in the first index storage and the address stored in the second index storage.

According to still another aspect of the present invention disclosure, there is provided a memory system including a memory device configured to dynamically detect a program-completed address during a program operation according to program addresses, and a controller configured to dynamically detect a range of program-uncompleted addresses among the program addresses based on the program-completed address and place on hold, when a target read address falls is the range, a read operation on the target read address.

BRIEF DESCRIPTION OF THE DRAWINGS

Various embodiments will now be described in more detail hereinafter with reference to the accompanying drawings; however, elements and features of the present invention may be configured or arranged differently than disclosed herein. Thus, the present invention is not limited to the embodiments set forth herein. Rather, these embodiments are provided so that this disclosure is thorough and complete, and fully conveys the scope of the example embodiments to those skilled in the art. Also, throughout the specification, reference to "an embodiment" or the like is not necessarily to only one embodiment, and different references to any such phrase are not necessarily to the same embodiment(s).

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present disclosure have been shown and described, simply by way of illustration. As will be apparent to those skilled in the art, the described embodiments may be modified in various different ways, all without departing from the spirit or scope of the present disclosure. Accordingly, the drawings and description are to be regarded as illustrative in nature and not restrictive. That is, the present invention is not limited to the embodiments set forth herein.

While terms such as "first" and "second" may be used to identify various components, such components are not limited to the above terms. The above terms are used only to distinguish one component from another that otherwise have the same or similar names. For example, a first component in one instance may be referred to as a second component in another instance and vice versa without limiting the scope of rights of the present disclosure.

It will be understood that when an element is referred to as being "connected" or "coupled" to another element, it can be directly connected or coupled to the other element or be indirectly connected or coupled to the another element with one or more intervening elements interposed therebetween. In addition, when an element is referred to as "including" a component, this indicates that the element may further include another component instead of excluding another component unless there is different disclosure. Other expressions describing relationships between components such as "~between," "immediately~between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. It will be further understood that terms such as "including" or "having," as well as other open ended terms, are intended to indicate the existence of stated features, numbers, operations, actions, components, parts, or combinations thereof but are not intended to preclude the possibility that one or more other features, numbers, operations, actions, components, parts, or combinations thereof may exist or may be added.

In describing those embodiments, description of techniques that are well known in the applicable and not directly related to the present disclosure is omitted. Thus, the present invention is not unnecessarily obscured.

Hereinafter, exemplary embodiments of the present disclosure will be described with reference to the accompanying drawings.

Figure 1:
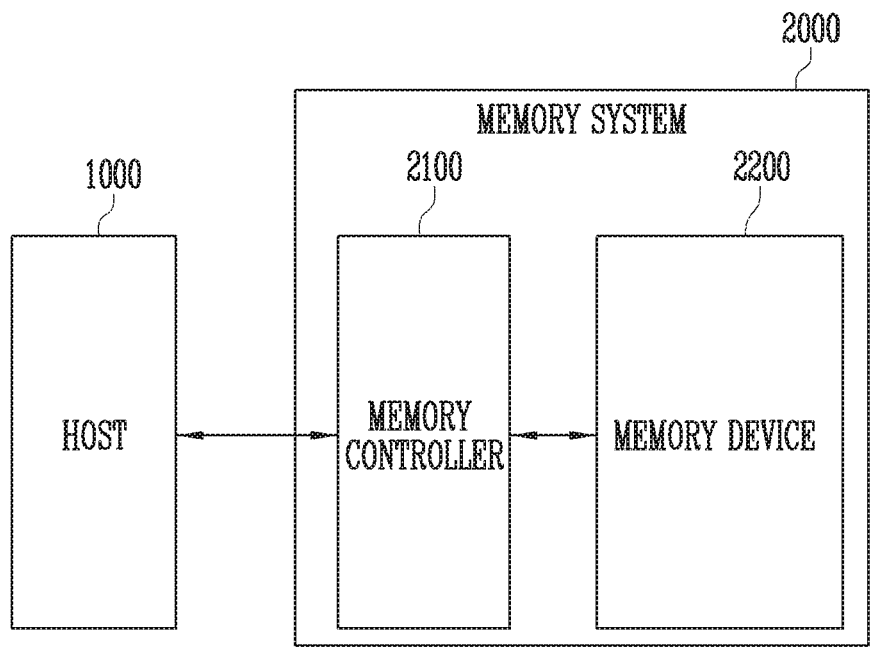
FIG. 1 is a diagram illustrating a memory system according to an embodiment of the present disclosure.

FIG. 1 is a diagram illustrating a memory system 2000 according to an embodiment of the present disclosure.

Referring to FIG. 1, the memory system 2000 may include a memory device 2200 for storing data and a memory controller 2100 for controlling the memory device 2200 under the control of a host 1000.

The host 1000 may communicate with the memory system 2000 by using an interface protocol such as Peripheral Component Interconnect-Express (PCI-e or PCIe), Advanced Technology Attachment (ATA), Serial ATA (SATA), Parallel ATA (PATA), or Serial Attached SCSI (SAS). Interface protocols between the host 1000 and the memory system 2000 are not limited to the above-described examples, and may be interface protocols such as a Universal Serial Bus (USB), a Multi-Media Card (MMC), an Enhanced Small Disk Interface (ESDI), and Integrated Drive Electronics (IDE).

The memory controller 2100 may control overall operations of the memory system 2000, and control data exchange between the host 1000 and the memory device 2200. For example, the memory controller 2100 may translate received information such that a command, an address, and data can be communicated between the host 1000 and the memory device 2200, and store and output the translated information. For example, in a program operation, the memory controller 2100 may transmit a program command, an address, data, and the like to the memory device 2200. For example, in a read operation, the memory controller 2100 may transmit a read command, an address, and the like to the memory device 2200. For example, in an erase operation, the memory controller 2100 may transmit an erase command, an address, and the like to the memory device 2200.

The memory device 2200 may be configured as a volatile memory device in which stored data disappears when the supply of power is interrupted or a nonvolatile memory device in which stored data is retained even when the supply of power is interrupted. The memory device 2200 may perform, for example, a program operation, a read operation, an erase operation, a data compression operation, a copy-back operation, and the like under the control of the memory controller 2100.

The memory device 2200 may perform a program operation in response to a program command received from the memory controller 2100, or perform a read operation in response to a read command received from the memory controller 2100. When a command for requesting program progress state information is received from the memory controller 2100, the memory device 2200 may transmit the program progress state information to the memory controller 2100. For example, the memory device 2200 may transmit information on an address at which the program operation is completed to the memory controller 2100.

Figure 2:
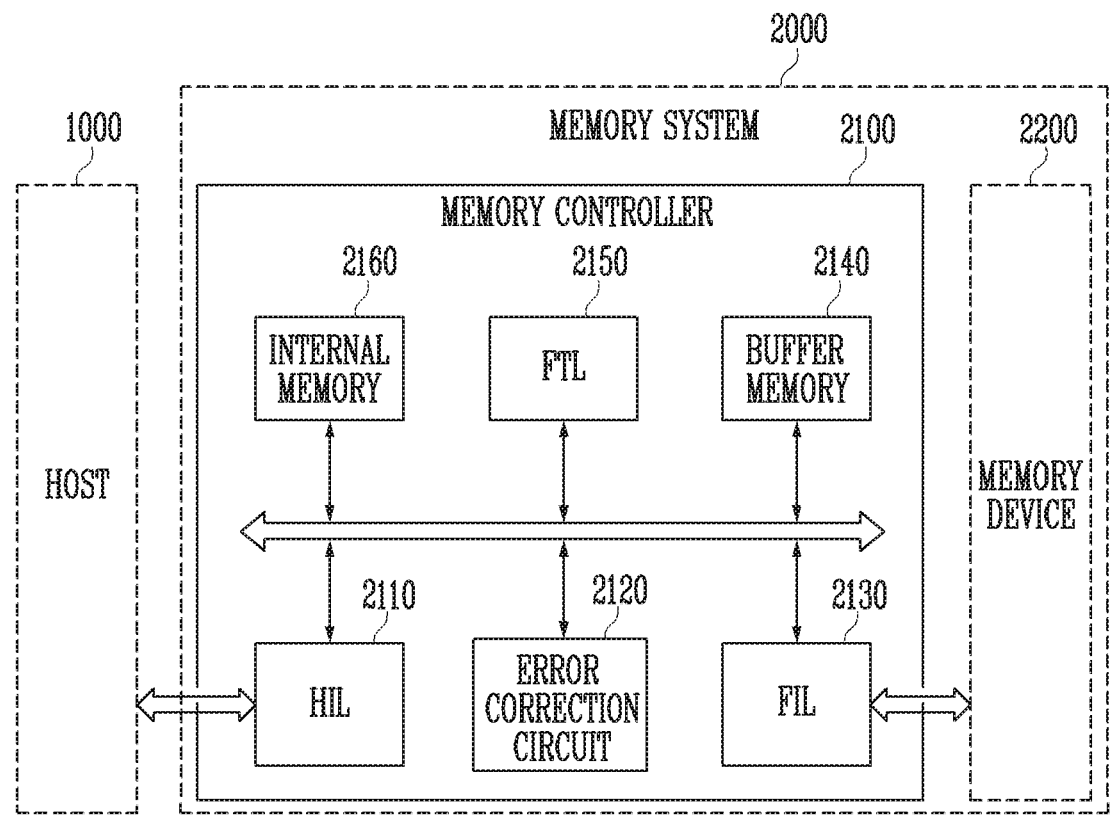
FIG. 2 is an exemplary diagram illustrating a memory controller according to an embodiment of the present disclosure.

FIG. 2 is an exemplary diagram illustrating a memory controller, for example, the memory controller 2100 shown in FIG. 1.

Referring to FIG. 2, the memory controller 2100 may include a host interface layer (HIL) 2110, an error correction circuit 2120, a flash interface layer (FIL) 2130, a buffer memory 2140, a flash translation layer (FTL) 2150, and an internal memory 2160. The HIL 2110, the error correction circuit 2120, the FIL 2130, the buffer memory 2140, and the internal memory 2160 may be controlled by the FTL 2150.

The HIL 2110 may perform data exchange with the host 1000 by using a communication protocol. The HIL 2110 may transfer a program request (hereinafter, referred to as a host program request) received from the host 1000 to the FTL 2150. The HIL 2110 may transfer a read request (hereinafter, referred to as a host read request) received from the host 1000 to the FTL 2150.

The error correction circuit 2120 may perform Error Correction Code (ECC) encoding in a program operation, or perform ECC decoding in a read operation.

The FIL 2130 may perform communication with the memory device 2200 by using a communication protocol. The FIL 2130 may store a command and addresses, which are received from the FTL 2150, and transmit the stored command and addresses to the memory device 2200. The FIL 2130 may transfer data and information, which are received from the memory device 2200, to the FTL 2150.

The buffer memory 2140 may temporarily store data while the memory controller 2100 is controlling the memory device 2200. For example, data received from the host 1000 until a program operation is completed may be temporarily stored in the buffer memory 2140. In addition, data read from the memory device 2200 in a read operation may be temporarily stored in the buffer memory 2140.

The FTL 2150 may perform various calculations or generate commands and addresses to control the memory device 2200. For example, the FTL 2150 may generate various commands necessary for a program operation, a read operation, an erase operation, a data compression operation, a copy-back operation, and program progress state check operation and addresses corresponding to the operations.

The FTL 2150 may control a program operation of the memory device 2200 in response to a host program request received from the HIL 2110. For example, FTL 2150 may generate a program command and a program address in response to the host program request, and transmit the program command and the program address to the FIL 2130.

When a host read request is received while the program operation of the memory device 2200 is being controlled in response to the host program request, the FTL 2150 may control a read operation of the memory device 2200. That is, when a host read request is received from the HIL 2110 after the FTL 2150 generates the program command and the program address in response to the host program request and transmits the program command and the program address to the FIL 2130, the FTL 2150 may control the read operation of the memory device 2200.

That the FTL 2150 controls the read operation of the memory device 2200 may mean that the FTL 2150 generates a read command and a target read address in response to a host read request and transmits the read command and the target read address to the FIL 2130, or performs a barrier operation in response to the host read request. That the FTL 2150 performs the barrier operation in response to the host read request may mean that the FTL 2150 delays generation of the read command for the host read request and holds the host read request.

When a host read request is received after the FTL 2150 transmits a program command and a plurality of program addresses to the memory device 2200 in response to the host program request, the FTL 2150 may check whether a target read address corresponding to the host read request is included in the plurality of program addresses transmitted to the memory device 2200. That is, the FTL 2150 may check whether the target read address corresponds to any one of the plurality of program addresses.

When the target read address is included in the plurality of program addresses, i.e., when the target read address corresponds to any one of the plurality of program addresses, the FTL 2150 may check whether a program operation for a program address corresponding to the target read address has been completed.

When the FTL 2150 determines that the program operation on the program address corresponding to the target read address has been completed, the FTL 2150 may generate a read command for the target read address and transmit the read command to the FIL 2130.

When the FTL 2150 determines that the program operation on the program address corresponding to the target read address has not been completed, the FTL 2150 may perform a barrier operation on the target read address. That the FTL 2150 performs the barrier operation on the target read address may mean that the FTL 2150 performs a barrier operation in response to a host read request corresponding to the target read address. When the host read request corresponds to a plurality of target read addresses, the FTL 2150 may perform a barrier operation on each of the plurality of target read addresses according to whether a program operation on a program address corresponding to each of the plurality of target read addresses has been completed.

The FTL 2150 may check a program progress state for a program address corresponding to the target read address (hereinafter, referred to as a "barrier-operated target read address") for which the barrier operation is performed. To this end, the FTL 2150 may generate a command for requesting program progress state information for a program address corresponding to the barrier-operated target read address and transmit the generated command to the FIL 2130. Subsequently, the FTL 2150 may check whether a program operation for the program address corresponding to the barrier-operated target read address has been completed with reference to program progress state information received from the memory device 2200 through the FIL 2130.

When the FTL 2150 determines that the program operation for the program address corresponding to the barrier-operated target read address has been completed, the FTL 2150 may generate a read command for the barrier-operated target read address and transmit the generated read command to the FIL 2130.

The internal memory 2160 may be used as a storage unit for storing various information necessary for an operation of the memory controller 2100. For example, the internal memory 2160 may be implemented with a Static Random Access Memory (SRAM). The internal memory 2160 may store a plurality of tables. For example, the internal memory 2160 may store a mapping table between logical and physical addresses.

Figure 3:
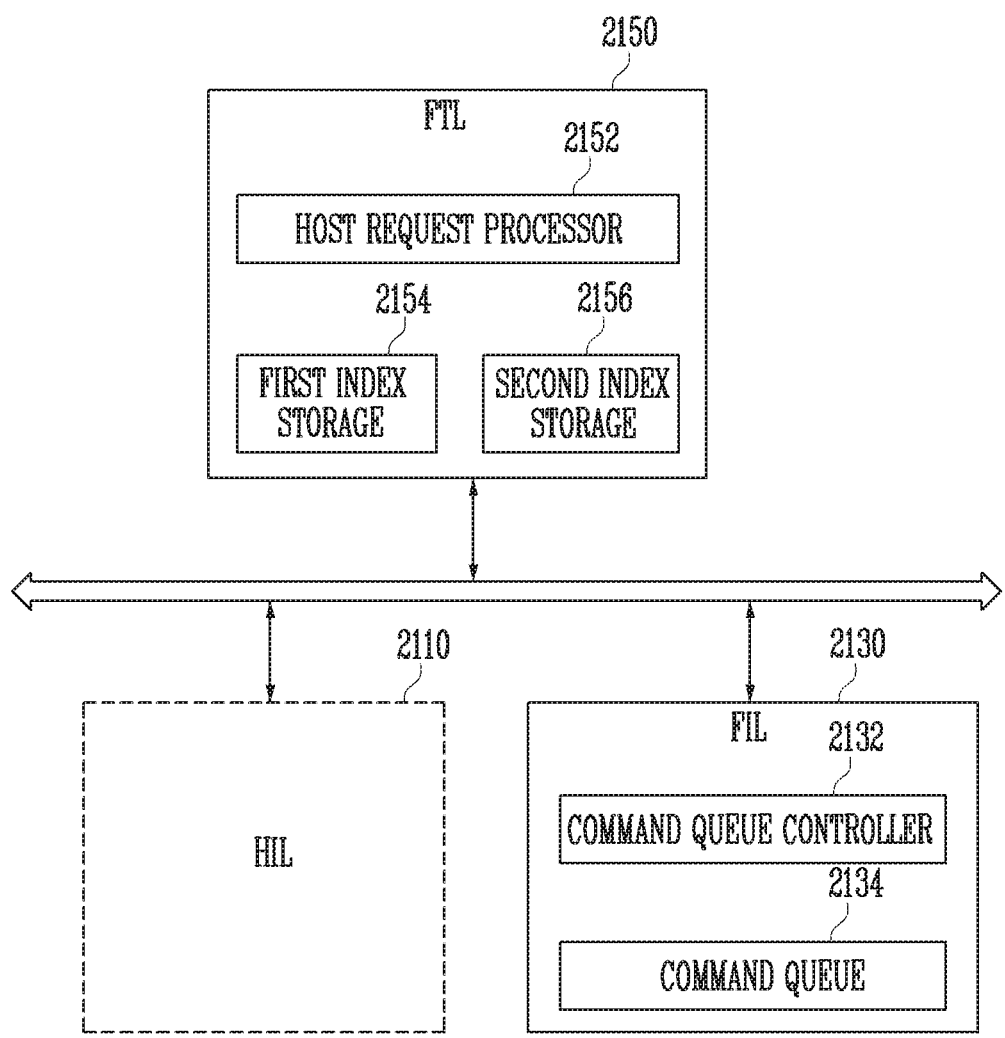
FIG. 3 is an exemplary diagram illustrating a flash translation layer and a flash interface layer, according to an embodiment of the present disclosure.

FIG. 3 is an exemplary diagram illustrating a flash translation layer (FTL) and a flash interface layer (FIL), for example, the FTL 2150 and the FIL 2130, respectively, which are shown in FIG. 2.

Referring to FIG. 3, the FTL 2150 according to the embodiment of the present disclosure may include a host request processor 2152, a first index storage 2154, and a second index storage 2156.

When a host program request is received from the HIL 2110, the host request processor 2152 may translate a logical address included in the host program request into a program address that is a physical address. The host request processor 2152 may generate a program command to control a program operation in response to the host program request, and transmit a program command and a program address to the FIL 2130. The program address may include a start address and a last address, at which the program operation is to be performed.

After the program command and the program address are transmitted to the FIL 2130, the host request processor 2152 may set and update index values stored in the first index storage 2154 and the second index storage 2156. A program address at which the program operation is completed may be stored as a first index value in the first index storage 2154. Initially, the first index value stored in the first index storage 2154 may be a null value, and the first index value may be updated when the program operation on the program address is completed. A start address to be used in a next host program request may be stored as a second index value in the second index storage 2156.

For example, when assuming that program addresses corresponding to the host program request includes address 1 to address 5, the host request processor 2152 may transmit the address 1 to the address 5 and the program command to the FIL 2130. The host request processor 2152 may initially store a null value as the first index value in the first index storage 2154, and store address 6 as the second index value in the second index storage 2156. Subsequently, when program progress state information is updated, the FTL 2150 may update the first index value stored in the first index storage 2154. For example, when the FTL 2150 determines in the above example that a program operation on the address 1 and the address 2 has been completed, the FTL 2150 may update the first index value stored in the first index storage 2154 as the address 2. The second index value stored in the second index storage 2156 may be updated when a program command corresponding to a next host program request is generated after all program operations corresponding to a current host program request are completed.

When a host read request is received from the HIL 2110, the host request processor 2152 may translate a logical address included in the host read request into a target read address that is a physical address. The host request processor 2152 may compare the target read address with the first index value stored in the first index storage 2154 and the second index value stored in the second index storage 2156, and control a read operation of the memory device 2200, based on the comparison result. That is, the host request processor 2152 may transmit the read command and the target read address to the FIL 2130 in response to the host read request, or perform a barrier operation for the host read request.

For example, the host request processor 2152 may check whether the target read address is located between the first index value stored in the first index storage 2154 and the second index value stored in the second index storage 2156.

When the target read address is located between the first index value and the second index value, i.e., when the target read address is greater than the first index value and is less than the second index value, the host request processor 2152 may perform a barrier operation on the target read address. For example, when assuming that a program operation is performed in a sequence where an address increases, that the target read address is located between the first index value and the second index value means that a program operation on a program address corresponding to the target read address has not been completed. That is, when the program operation is performed on pages corresponding to the first index value, pages corresponding to addresses between the first index value and the second index value are in a state in which the program operation is not performed thereon. The host request processor 2152 may perform the barrier operation on the target read address until the program operation on a page corresponding to the target read address is completed.

When the target read address is not located between the first index value and the second index value, i.e., when the target read address is equal to or less than the first index value, the host request processor 2152 may generate a read command such that a read operation on the target read address can be performed, and transmit the read command and the target read address to the FIL 2130. When the target read address is equal to or less than the first index value, this means that the program operation on the program address corresponding to the target read address has been completed. Therefore, the read command is output such that the read operation on the target read address can be performed. When the target read address is equal to or greater than the second index value, the target read address may have nothing to do with the current program operation. Therefore, the read command is output such that the read operation on the target read address can be performed.

Meanwhile, after a barrier operation on the host read request is performed, the host request processor 2152 may continuously check a program progress state of the memory device 2200. When the host request process 2152 determines that a program operation on a program address corresponding to the barrier-operated target read address has been completed, the host request processor 2152 may generate a read command such that a read operation on the barrier-operated target read address can be performed, and transmit the read command and the barrier-operated target read address to the FIL 2130.

The FIL 2130, according to the embodiment of the present disclosure, may include a command queue controller 2132 and a command queue 2134.

The command queue controller 2132 may receive a command and addresses from the FTL 2150, and store the received command and addresses to the command queue 2134. The command queue controller 2132 may sequentially store the received command and addresses in the command queue 2134, and transmit the command and addresses to the memory device 2200 in a sequence where the command and addresses are stored.

The command queue controller 2132 may control an output sequence of the command and addresses stored in the command queue 2134. For example, a higher order of priority may be given to a command that requires immediate execution, so that the output sequence of the corresponding command and address can be advanced. Whether the command requires immediate execution may be determined according to a command type. For example, in the case of a flush command, the immediate execution may be required. Therefore, when the flush command which requires immediate execution is received, the command queue controller 2132 may control the command queue 2134 such that the flush command is preferentially processed, that is, in a higher order of priority.

Figure 4:
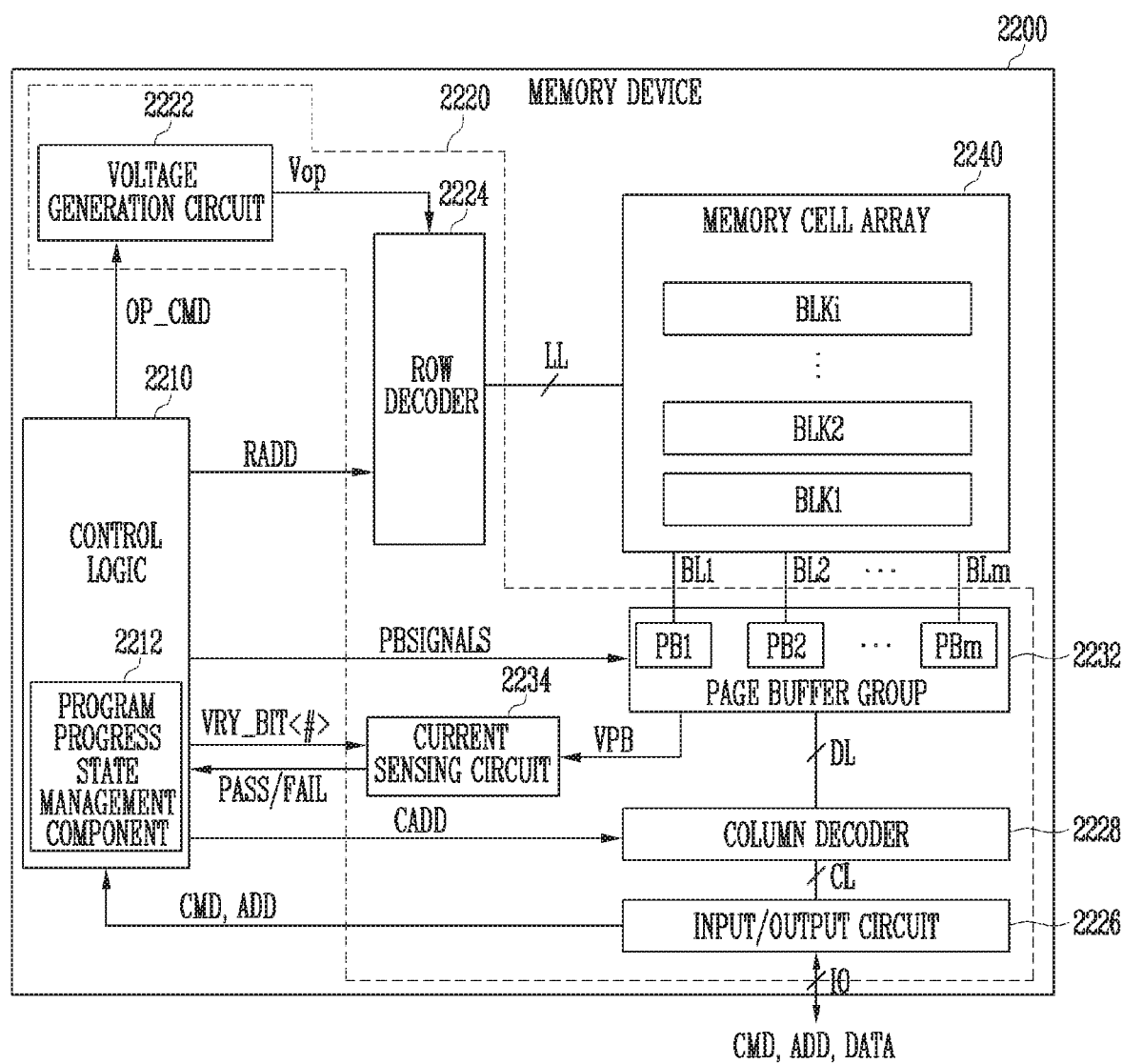
FIG. 4 is an exemplary diagram illustrating a memory device according to an embodiment of the present disclosure.

FIG. 4 is an exemplary diagram illustrating a memory device, for example, the memory device 2200 shown in FIG. 1.

The memory device 2200 may include a control logic 2210, a peripheral circuit 2220, and a memory cell array 2240. The peripheral circuit 2220 may include a voltage generation circuit 2222, a row decoder 2224, an input/output circuit 2226, a column decoder 2228, a page buffer group 2232, and a current sensing circuit 2234.

The control logic 2210 may control the peripheral circuit 2220 under the control of the memory controller 2100 shown in FIG. 1.

The control logic 2210 may control the peripheral circuit 2220 in response to a command CMD and an address ADD, which are received from the memory controller 2100 through the input/output circuit 2226. For example, the control logic 2210 may output an operation signal OP_CMD, a row address RADD, page buffer control signals PBSIGNALS, and an allow bit VRY_BIT<#> in response to the command CMD and the address ADD. The control logic 2210 may determine whether a verify operation has passed or failed in response to a pass signal PASS or a fail signal FAIL, which is received from the current sensing circuit 2234.

The control logic 2210 may include a program progress state management component 2212. The program progress state management component 2212 may store program progress state information on a program address. For example, when a program operation on a program address is completed, the program progress state management component 2212 may store the corresponding program address. When a command for requesting program progress state information is received from the memory controller 2100, the program progress state management component 2212 may provide the stored program address to the memory controller 2100. Whether the program operation has been completed may be checked based on the received pass signal PASS or fail signal FAIL. For example, when the pass signal PASS is received from the current sensing circuit 2234 in a program verify operation, it may be determined that the program operation has been completed.

The peripheral circuit 2220 may perform a program operation for storing data in the memory cell array 2240, a read operation for outputting data stored in the memory cell array 2240, and an erase operation for erasing data stored in the memory cell array 2240.

The voltage generation circuit 2222 may generate various operation voltages Vop used in the program, read, and erase operations in response to the operation signal OP_CMD received from the control logic 2210. For example, the voltage generation circuit 2222 may transfer, to the row decoder 2224, a program voltage, a verify voltage, a pass voltage, a read voltage, an erase voltage, a turn-on voltage, and the like.

The row decoder 2224 may transfer operation voltage Vop to local lines LL coupled to a selected memory block among memory blocks included in the memory cell array 2240 in response to the row address RADD received from the control logic 2210. The local lines LL may include local word lines, local drain select lines, and local source select lines. In addition, the local lines LL may include various lines coupled to the memory block, such as a source line.

The input/output circuit 2226 may transfer a command CMD and an address ADD, which are received from the memory controller 2100 through input/output lines JO, to the control logic 2210, or exchange data DATA with the column decoder 2228.

The column decoder 2228 may transfer data between the input/output circuit 2226 and the page buffer group 2232 in response to a column address CADD received from the control logic 2210. For example, the column decoder 2228 may exchange data with page buffers PB1 to PBm through data lines DL, or exchange data with the input/output circuit 2226 through column lines CL.

The page buffer group 2232 may be coupled to bit lines BL1 to BLm commonly coupled to memory blocks BLK1 to BLKi. The page buffer group 2232 may include a plurality of page buffers PB1 to PBm coupled to the bit lines BL1 to BLm. For example, one page buffer may be coupled to each bit line. The page buffers PB1 to PBm may operate in response to the page buffer control signals PBSIGNALS received from the control logic 2210. For example, the page buffers PB1 to PBm may temporarily store program data received from the memory controller 2100 in a program operation, and adjust voltages applied to the bit lines BL1 to BLm according to the program data. Also, the page buffers PB1 to PBm may temporarily store data received through the bit lines BL1 to BLm in a read operation, or sense voltages or currents of the bit lines BL1 to BLm.

The current sensing circuit 2234 may generate a reference current in response to the allow bit VRY_BIT<#> received from the control logic 2210 in a read operation or verify operation, and output the pass signal PASS or the fail signal FAIL by comparing a reference voltage generated by the reference current and a sensing voltage VPB received from the page buffer group 2232.

The memory cell array 2240 may include a plurality of memory blocks BLK1 to BLKi for storing data. User data and various information necessary for an operation of the memory device 2200 may be stored in the memory blocks BLK1 to BLKi. The memory blocks BLK1 to BLKi may be implemented in a two-dimensional structure or a three-dimensional structure, and be configured identical to one another.

Figure 5:
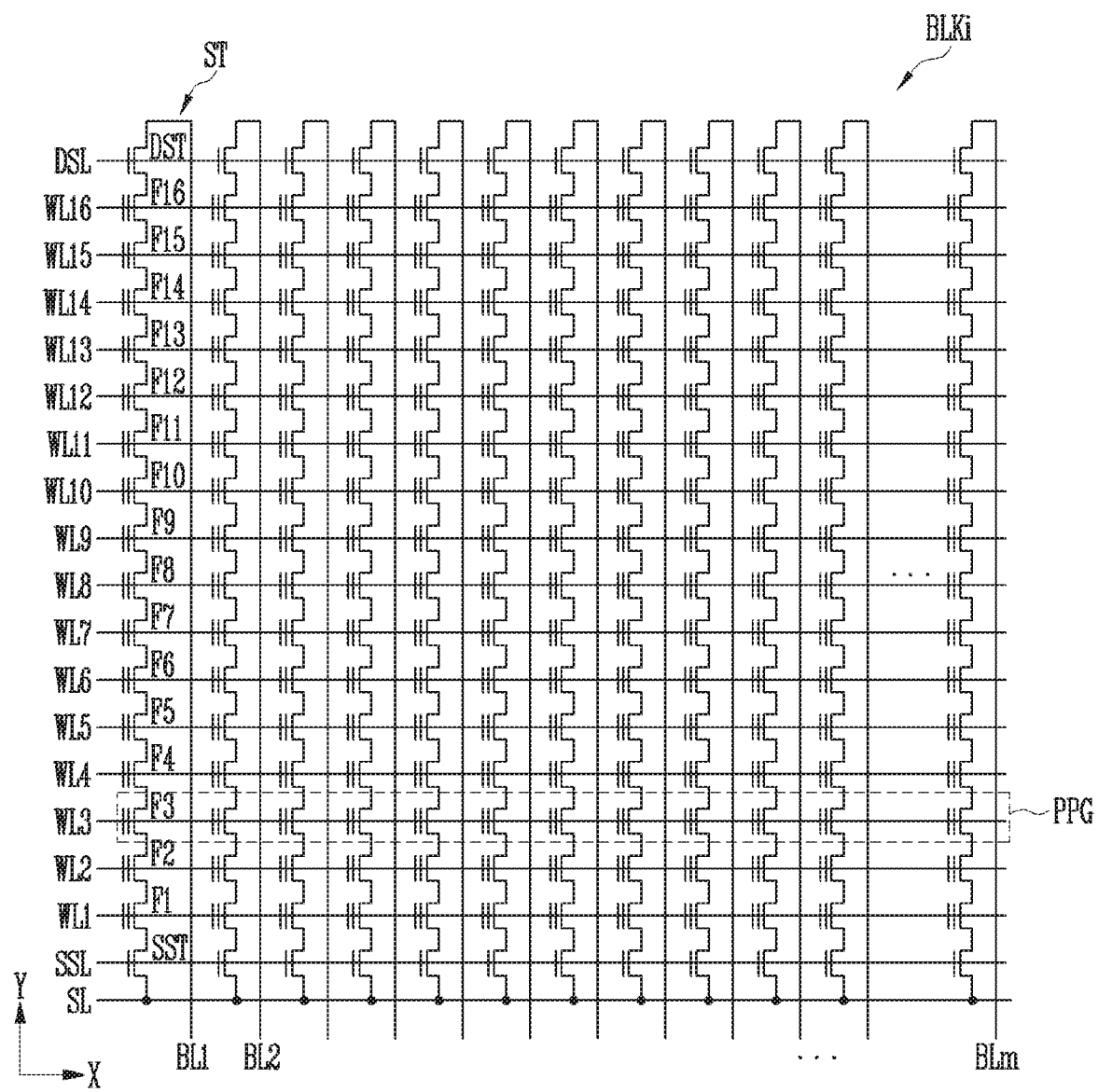
FIG. 5 is an exemplary diagram illustrating a memory block.

FIG. 5 is an exemplary diagram illustrating a memory block BLKi.

The memory cell array may include a plurality of memory blocks, for example, the memory blocks BLK1 to BLKi shown in FIG. 4. The memory block BLKi may correspond to any one memory block among the plurality of memory blocks BLK1 to BLKi shown in FIG. 4.

In the memory block BLKi, a plurality of word lines WL1 to WL16 arranged in parallel to one another may be coupled between a first select line and a second select line. The first select line may be a source select line SSL, and the second select line may be a drain select line DSL. Specifically, the memory block BLKi may include a plurality of strings ST coupled between bit lines BL1 to BLm and a source line SL.

The bit lines BL1 to BLm may be coupled to the strings ST, respectively, and the source line SL may be commonly coupled to the strings ST. The strings ST may be configured identical to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and memory cells of which number is larger than that of the memory cells F1 to F16 shown in the drawing may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings ST may be coupled to the source select line SSL, gates of drain select transistors DST included in different strings ST may be coupled to the drain select line DSL, gates of the memory cells F1 to F16 included in different strings ST may be coupled to the plurality of word lines WL1 to WL16. A group of memory cells coupled to the same word line among the memory cells included in different strings ST may be a physical page PPG. Therefore, physical pages PPG of which number corresponds to that of the word lines WL1 to WL16 may be included in the memory block BLKi.

One memory cell may store data of one bit. This is called a single level cell (SLC). One physical page PPG may store one logical page (LPG) data. The one LPG data may include data bits of which number corresponds to that of cells included in one physical page PPG. For example, when bit data of two or more is stored in one memory cell, one physical page PPG may store two or more LPG data. For example, in a multi-level cell (MLC) type memory device, two LPG data may be stored in one physical page PPG. In a triple level cell (TLC) type memory device, three LPG data may be stored in one physical page PPG. In the present invention, memory cells included in the respective memory blocks BLK1 to BLKi may be one or more of a single level cell (SLC), a multi-level cell (MLC), or a triple-level cell type. Hence, the memory device 2200 may include SLC memory blocks, MLC memory blocks, or TLC memory blocks depending on the number of bits which can be expressed or stored in each of the memory cells in the memory blocks.

Figure 6:
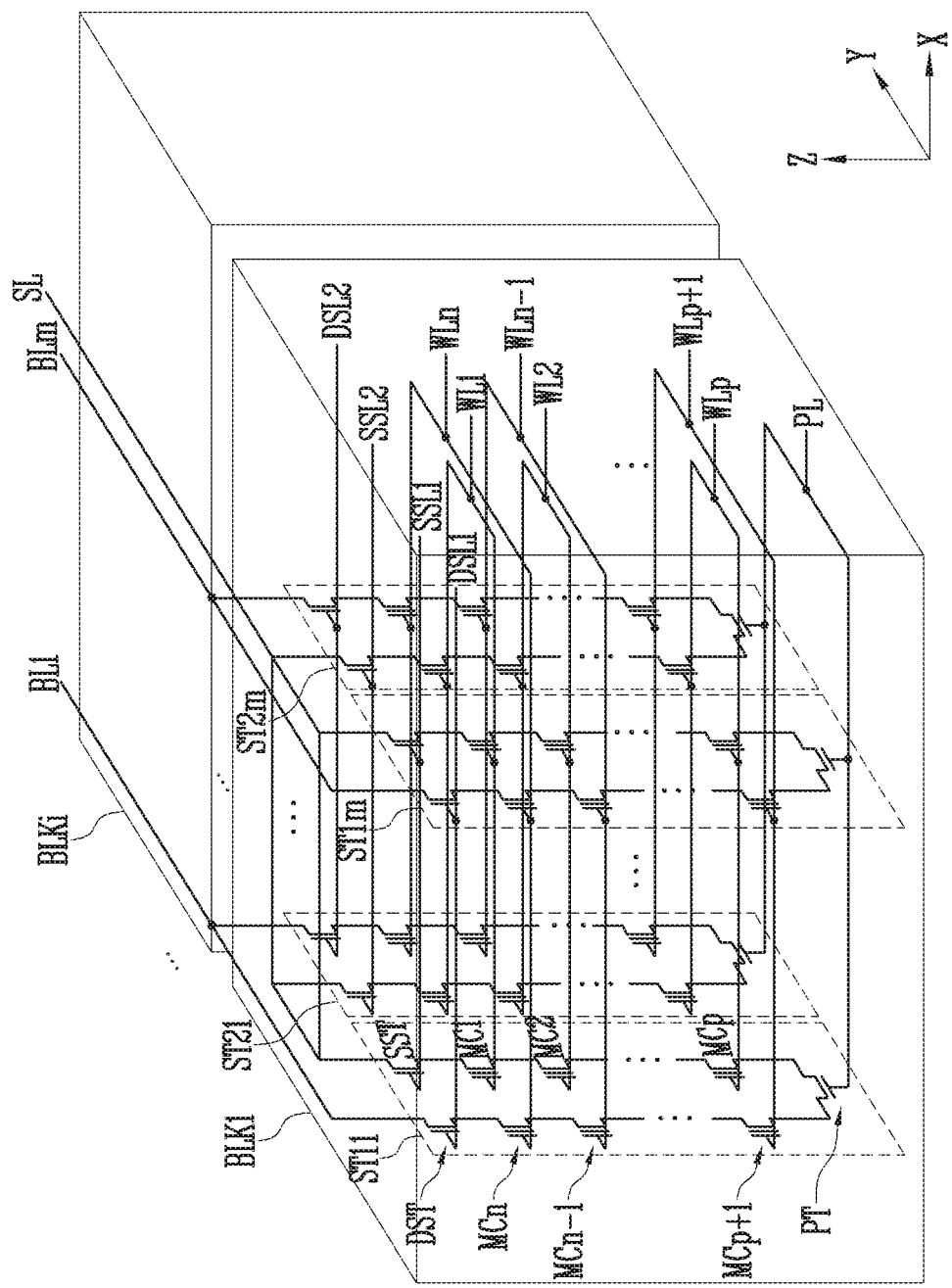
FIG. 6 is a diagram illustrating an embodiment of a three-dimensionally configured memory block.

FIG. 6 is a diagram illustrating an exemplary three-dimensional configuration of a plurality of memory blocks, for example, the memory blocks BLK1 to BLKi shown in FIG. 4, according to an embodiment.

The memory cell array 2240 may include the plurality of memory blocks BLK1 to BLKi. For ease of description and illustration, detailed configuration of only the first memory block BLK1 will be described as an example. The first memory block BLK1 may include a plurality of strings ST11 to ST1m and ST21 to ST2m. In an embodiment, each of the plurality of strings ST11 to ST1m and ST21 to ST2m may be formed in a 'U' shape. In the first memory block BLK1, m strings may be arranged in a row direction (X direction). Although FIG. 6 illustrates that two strings are arranged in a column direction (Y direction), this is for convenience of description, and three or more strings may be arranged in the column direction (Y direction).

Each of the plurality of strings ST11 to ST1m and ST21 to ST2m may include at least one source select transistor SST, first to nth memory cells MC1 to MCn, a pipe transistor PT, and at least one drain select transistor DST.

The source and drain select transistors SST and DST and the memory cells MC1 to MCn may have structures similar to one another. For example, each of the source and drain select transistors SST and DST and the memory cells MC1 to MCn may include a channel layer, a tunnel insulating layer, a charge trapping layer, and a blocking insulating layer. For example, a pillar for providing the channel layer may be provided in each string. For example, a pillar for providing at least one of the channel layer, the tunnel insulating layer, the charge trapping layer, and the blocking insulating layer may be provided in each string.

The source select transistor SST of each string may be coupled between a source line SL and memory cells MC1 to MCp.

In an embodiment, source select transistors of strings arranged in the same row may be coupled to a source select line extending in the row direction, and source select transistors of strings arranged in different rows may be coupled to different source select lines. In FIG. 6, source select transistors of strings ST11 to ST1m of a first row may be coupled to a first source select line SSL1. Source select transistors of strings ST21 to ST2m of a second row may be coupled to a second source select line SSL2.

In another embodiment, the source select transistors of the strings ST11 to ST1m and ST21 to ST2m may be commonly coupled to one source select line.

First to nth memory cells MC1 to MCn of each string may be coupled between the source select transistor SST and the drain select transistor DST.

The first to nth memory cells MC1 to MCn may be divided into first to pth memory cells MC1 to MCp and (p+1)th to nth memory cells MCp+1 to MCn. The first to pth memory cells MC1 to MCp may be sequentially arranged in a vertical direction (Z direction), and be coupled in series to each other between the source select transistor SST and the pipe transistor PT. The (p+1)th to nth memory cells MCp+1 to MCn may be sequentially arranged in the vertical direction (Z direction), and be coupled in series to each other between the pipe transistor PT and the drain select transistor DST. The first to pth memory cells MC1 to MCp and the (p+1)th to nth memory cells MCp+1 to MCn may be coupled to each other through the pipe transistor PT. Gates of the first to nth memory cells MC1 to MCn of each string may be coupled to first to nth word lines WL1 to WLn, respectively.

In an embodiment, at least one of the first to nth memory cells MC1 to MCn may be used as a dummy memory cell. When a dummy memory cell is provided, the voltage or current of a corresponding string can be stably controlled. A gate of the pipe transistor PT of each string may be coupled to a pipe line PL.

The drain select transistor DST of each string may be coupled to a bit line and the memory cells MCp+1 to MCn. Strings arranged in the row direction may be coupled to a drain select line extending in the row direction. Drain select transistors of the strings ST11 to ST1, of the first row may be coupled to a first drain select line DSL1. Drain select transistors of the strings ST21 to ST2m of the second row may be coupled to a second drain select line DSL2.

Strings arranged in the column direction may be coupled to bit lines extending in the column direction. In FIG. 6, strings ST11 and ST21 of a first column may be coupled to a first bit line BL1. Strings ST1m and ST2m of an mth column may be coupled to an mth bit line BLm.

Memory cells coupled to the same word line among the strings arranged in the row direction may constitute one page. For example, memory cells coupled to the first word line WL1 among the strings ST11 to ST1m of the first row may constitute one page. Memory cells coupled to the first word line WL1 among the strings ST21 to ST2m of the second row may constitute another page. When any one of the drain select lines DSL1 and DSL2 is selected, strings arranged in one row direction may be selected. When any one of the word lines WL1 to WLn is selected, one page among the selected strings may be selected.

Figure 7:
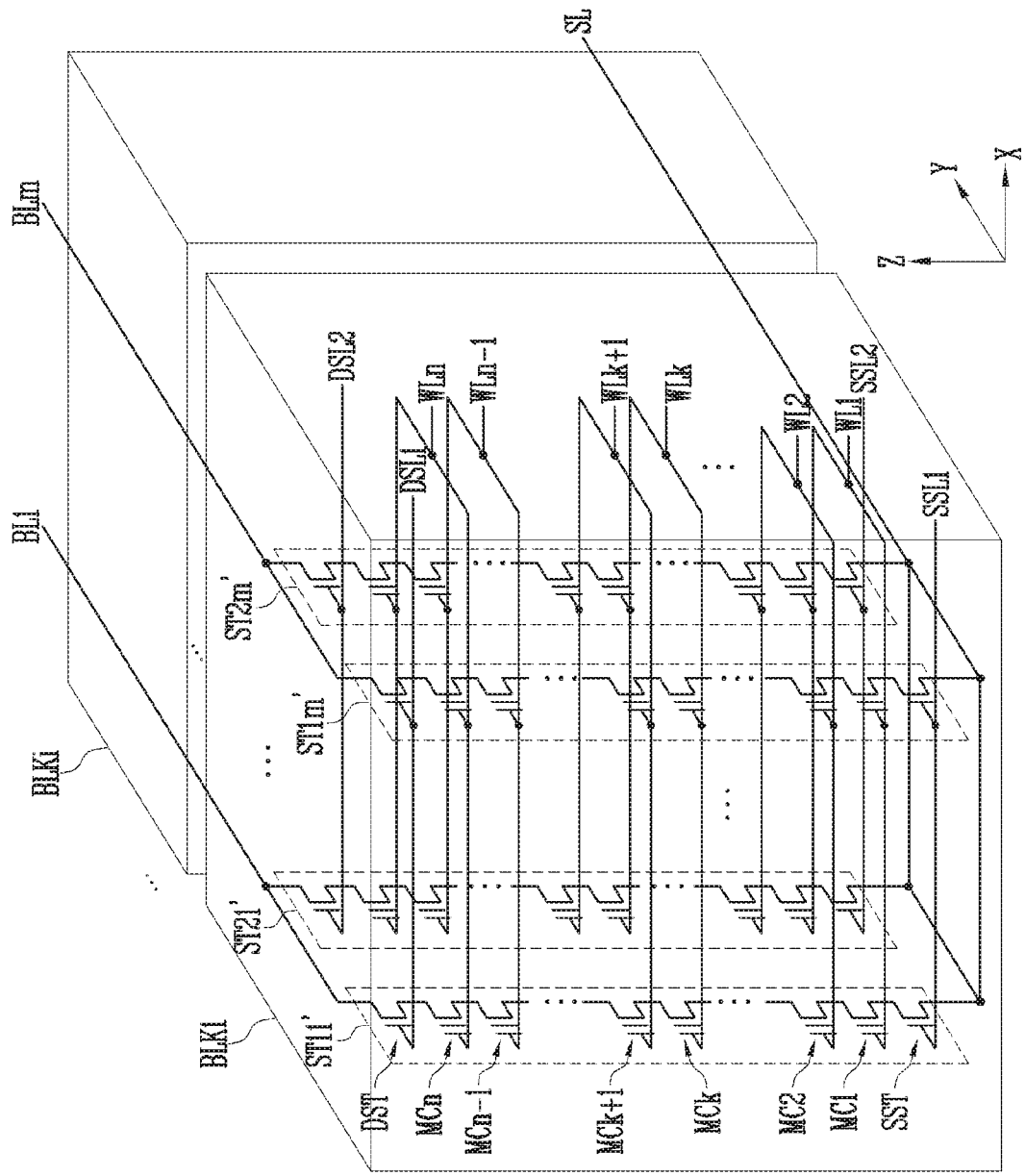
FIG. 7 is a diagram illustrating another embodiment of the three-dimensionally configured memory block.

FIG. 7 is a diagram illustrating another exemplary three-dimensional configuration of a plurality of memory blocks, for example, the memory blocks BLK1 to BLKi shown in FIG. 4, according to an embodiment.

The memory cell array 2240 may include a plurality of memory blocks BLK1 to BLKi. For ease of description and illustration, detailed configuration of only the first memory block BLK1 will be described as an example. The first memory block BLK1 may include a plurality of strings ST11' to ST1m' and ST21' to ST2m'. Each of the plurality of strings ST11' to ST1m' and ST21' to ST2m' may extend along a vertical direction (Z direction). In the first memory block BLK1, m strings may be arranged in a row direction (X direction). Although FIG. 7 illustrates that two strings are arranged in a column direction (Y direction), this is for convenience of description, and three or more strings may be arranged in the column direction (Y direction).

Each of the plurality of strings ST11' to ST1m' and ST21' to ST2m' may include at least one source select transistor SST, first to nth memory cells MC1 to MCn, and at least one drain select transistor DST.

The source select transistor SST of each string may be coupled between a source line SL and the memory cells MC1 to MCn. Source select transistors of strings arranged in the same row may be coupled to the same source select line. Source select transistors of strings ST11' to ST1m' arranged on a first row may be coupled to a first source select line SSL1. Source select transistors of strings ST21' to ST2m' arranged on a second row may be coupled to a second source select line SSL2. In another embodiment, the source select transistors of the strings ST11' to ST1m' and ST21' to ST2m' may be commonly coupled to one source select line.

The first to nth memory cells MC1 to MCn of each string may be coupled in series to each other between the source select transistor SST and the drain select transistor DST. Gates of the first to nth memory cells MC1 to MCn may be coupled to first to nth word lines WL1 to WLn, respectively.

In an embodiment, at least one of the first to nth memory cells MC1 to MCn may be used as a dummy memory cell. When a dummy memory cell is provided, the voltage or current of a corresponding string can be stably controlled. Accordingly, the reliability of data stored in the first memory block BLK1 can be improved.

The drain select transistor DST of each string may be coupled between a bit line and the memory cells MC1 to MCn. Drain select transistors DST of strings arranged in the row direction may be coupled to a drain select line extending in the row direction. The drain select transistors DST of the strings ST11' to ST1m' of the first row may be coupled to a first drain select line DSL1. The drain select transistors DST of the strings ST21' to ST2m' of the second row may be coupled to a second drain select line DSL2.

As a result, the plurality of memory blocks shown in FIG. 7 may have a circuit similar to that of the plurality of memory blocks shown in FIG. 6. That is, the pipe transistor PT in each string in the memory blocks of FIG. 6 may be excluded from the memory blocks of FIG. 7.

Figure 8:
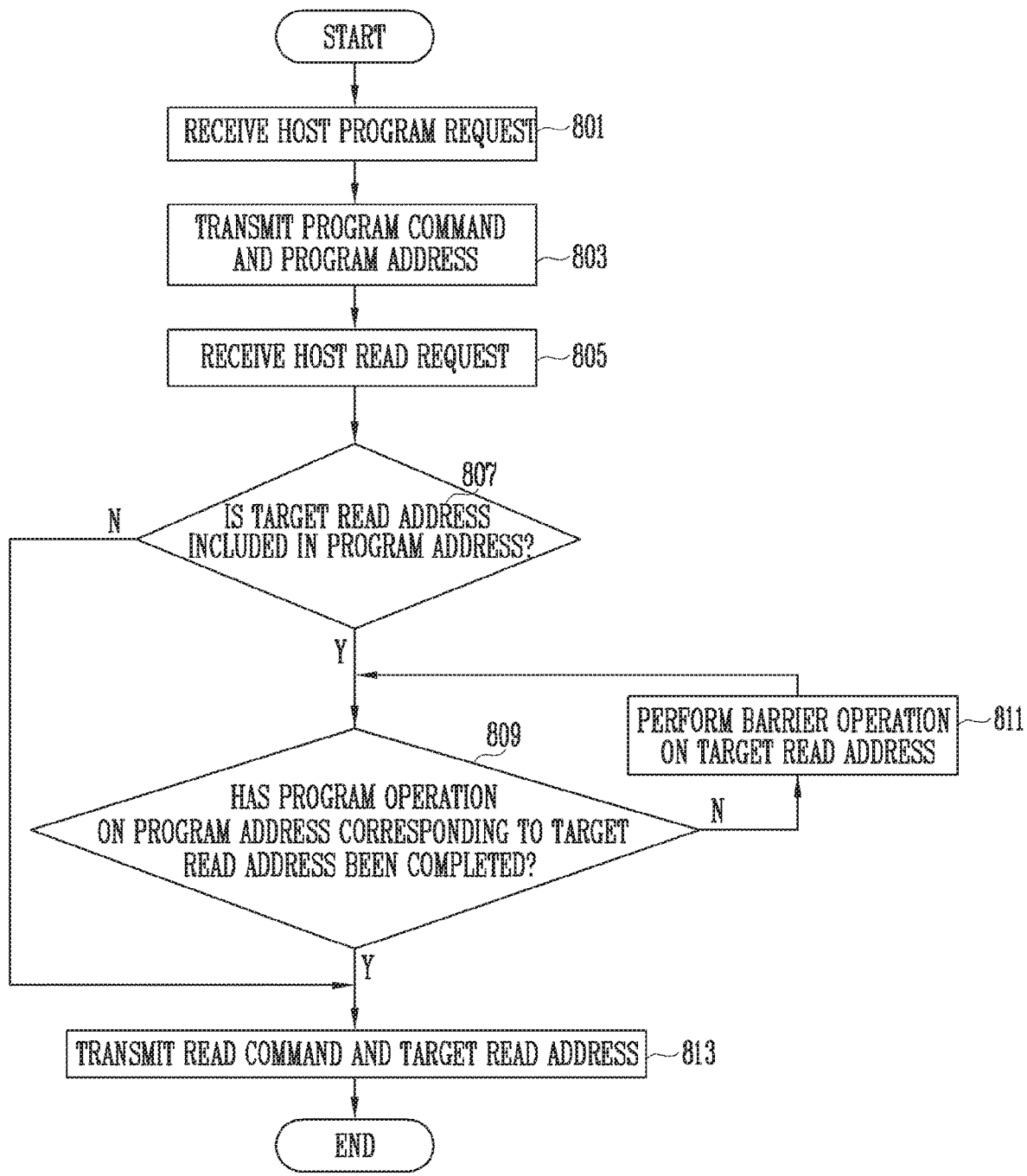
FIG. 8 is a flowchart describing an operating method of the memory controller according to an embodiment of the present disclosure.

FIG. 8 is a flowchart describing an operating method of a memory controller, for example, the memory controller 2100 shown in FIGS. 1 and 2.

In step 801, the memory controller 2100 may receive a host program request from the host 1000.

In step 803, the memory controller 2100 may translate logical addresses included in the host program request into program addresses that is physical addresses, and generate a program command corresponding to the host program request. The memory controller 2100 may transmit the program command and the program addresses to the memory device 2200.

In step 805, the memory controller 2100 may receive a host read request from the host 1000. The memory controller 2100 may translate a logical address included in the host read request into a target read address that is a physical address.

In step 807, the memory controller 2100 may check whether the target read address is included in the program addresses. When the target read address is included in the program addresses (that is, "Y" at step 807), the process may proceed to step 809. When the target read address is not included in the program address (that is, "N" at step 807), the process may proceed to step 813.

In step 809, the memory controller 2100 may check whether a program operation on a program address corresponding to the target read address has been completed. When the memory controller 2100 determines that the program operation on the program address corresponding to the target read address has been completed (that is, "Y" at step 809), the process may proceed to step 813. When the memory controller 2100 determines that the program operation on the program address corresponding to the target read address has not been completed (that is, "N" at step 809), the process may proceed to step 811.

In step 811, the memory controller 2100 may perform a barrier operation on the target read address. That is, the memory controller 2100 may place the host read request corresponding to the target read address on hold until the program operation on the address corresponding to the target read address is completed.

In step 813, the memory controller 2100 may transmit a read command and the target read address to the memory device 2200. That is, the memory controller 2100 may transmit the read command and the target read address to the memory device 2200 when the target read address is not included in the program addresses or when the program operation on the program address corresponding to the target read address is completed.

Hereinafter, various embodiments in which the host program request and the host read request are received will be described with reference to FIGS. 9 to 15. When the target read address is not included in the program addresses, a read operation on the target read address may be performed according to a general procedure. Therefore, in the embodiments described with reference to FIGS. 9 to 15, the target read address will be described by assuming that it is included in the program addresses.

Figure 9:
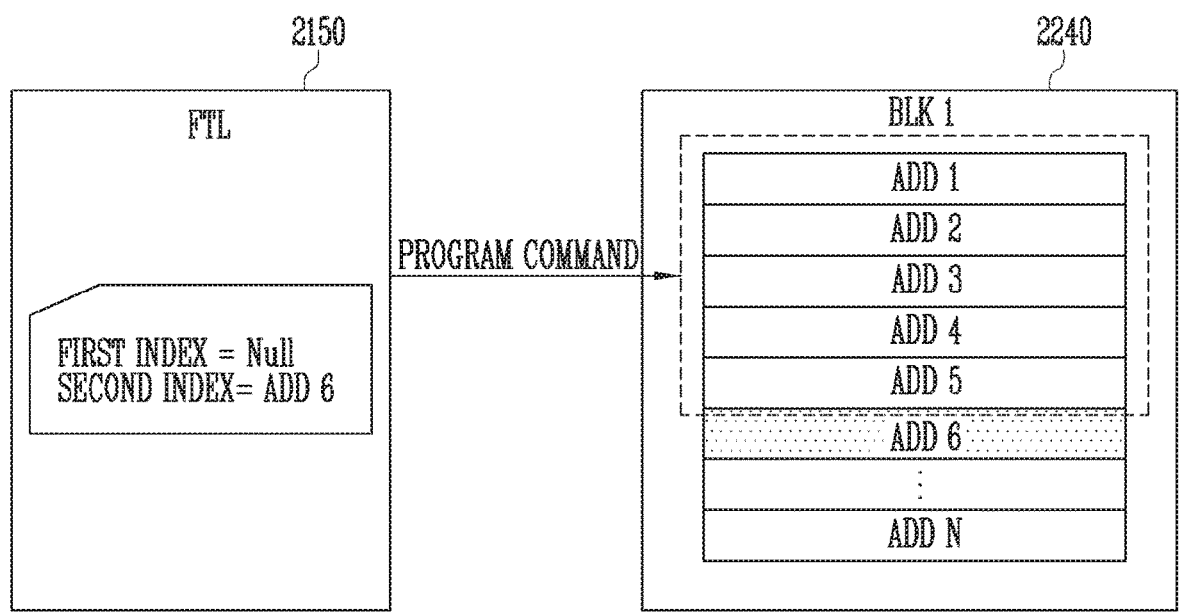
FIG. 9 is an exemplary diagram illustrating information managed in the flash translation layer when a program command is transmitted in response to a host program request, according to an embodiment of the present disclosure.

FIG. 9 is an exemplary diagram illustrating information managed in the FTL, for example the FTL 2150 shown in FIG. 3, when a program command is transmitted in response to a host program request.

In the embodiment described with reference to FIG. 9, it is assumed that the host program request has been received, and a logical addresses included in the host program request corresponds to program addresses ADD 1 to ADD 5. Therefore, FIG. 9 illustrates a case where a program command for the program addresses ADD 1 to ADD 5 is transmitted to the memory device 2200.

As shown in FIG. 9, the FTL 2150 may be initially set a first index value as a null value, and set a second index value as address 6 ADD 6. That is, the FTL 2150 may set, as the second index value, the address 6 ADD 6 that is a start address to be used in a program operation when a next host program request is received.

Figure 10:
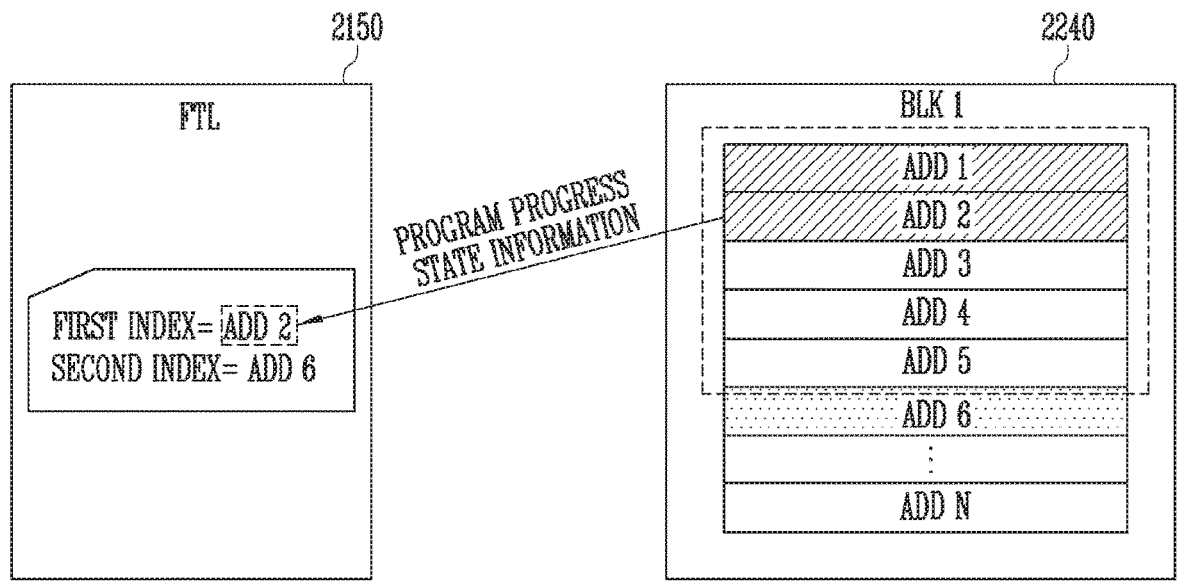
FIG. 10 is an exemplary diagram illustrating a process of updating the information managed in the flash translation layer, based on a program progress state, according to an embodiment of the present disclosure.

FIG. 10 is an exemplary diagram illustrating a process of updating the information managed in the FTL, for example the FTL 2150 shown in FIG. 3, based on a program progress state.

The embodiment described with reference to FIG. 10 illustrates a case after the operation described with reference to FIG. 9 is performed.

When program progress state information is received from the memory device 2200 after the program command for the program addresses ADD 1 to ADD 5 is transmitted to the memory device, the FTL 2150 may update the first index value.

For example, as shown in FIG. 10, when program progress state information indicating that a program operation on the address 2 ADD 2 has been completed is received from the memory device 2200, the FTL 2150 may update the first index value as the address 2 ADD 2.

Figure 11:
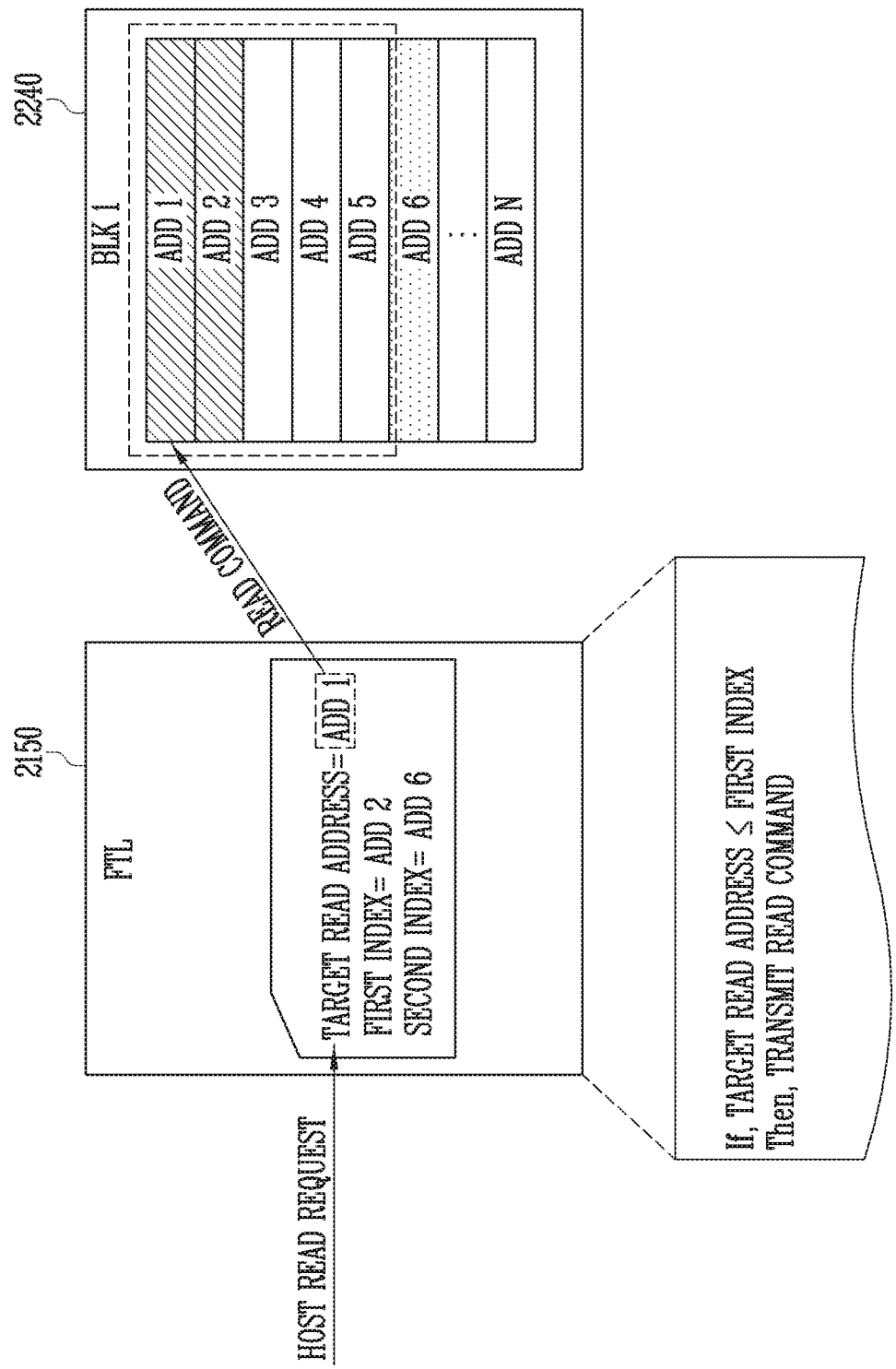
FIG. 11 is an exemplary diagram illustrating an operation performed by the flash translation layer when a host read request is received after the program command is transmitted, according to an embodiment of the present disclosure.

FIG. 11 is an exemplary diagram illustrating an operation performed by the FTL, for example the FTL 2150 shown in FIG. 3, when a host read request is received after the program command is transmitted.

The embodiment described with reference to FIG. 11 illustrates a case after the operation described with reference to FIG. 10 is performed.

In the embodiment described with reference to FIG. 11, it is assumed that the host read request has been received, and a logical address included in the host read request corresponds to a target read address ADD 1 that is a physical address.

The FTL 2150 may check whether the value of the target read address is equal to or less than the first index value. When the value of the target read address is equal to or less than the first index value, it means that the program operation on a program address corresponding to the target read address has been completed. Therefore, when the value of the target read address is equal to or less than the first index value, the FTL 2150 may generate and output a read command such that a read operation on the target read address can be performed.

For example, in FIG. 11, since the target read address ADD 1 is less than the first index value ADD 2, the FTL 2150 may generate and output a read command for the target read address ADD 1.

Figure 12:
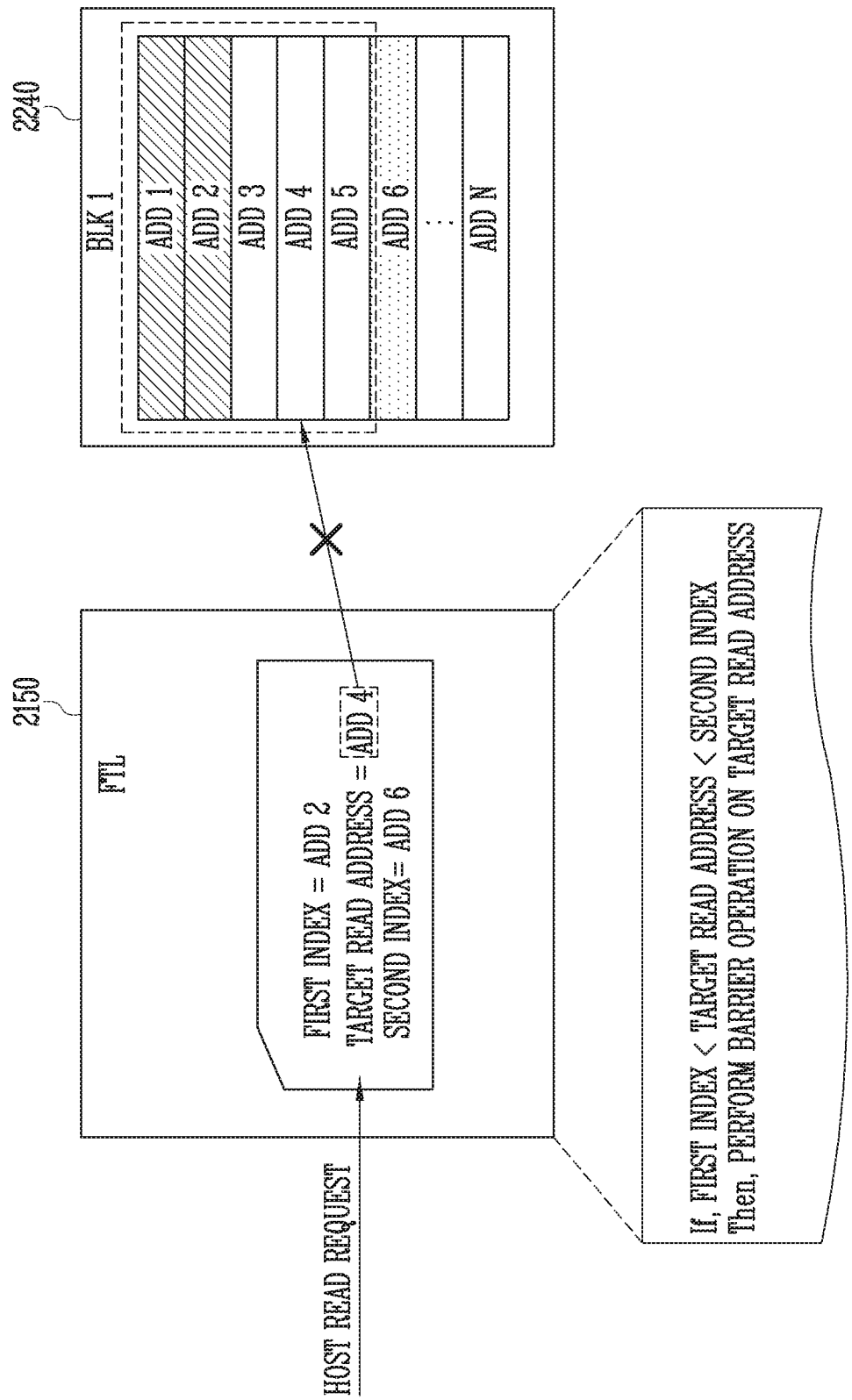
FIG. 12 is another exemplary diagram illustrating the operation performed by the flash translation layer when the host read request is received after the program command is transmitted, according to an embodiment of the present disclosure.

FIG. 12 is another exemplary diagram illustrating the operation performed by the FTL, for example the FTL 2150 shown in FIG. 3, when the host read request is received after the program command is transmitted.

The embodiment described with reference to FIG. 12 illustrates a case after the operation described with reference to FIG. 10 is performed.

In the embodiment described with reference to FIG. 12, it is assumed that the host read request has been received, and a logical address included in the host read request corresponds to a target read address ADD 4 that is a physical address.

First, the FTL 2150 may check whether the value of the target read address is equal to or less than the first index value. When the value of the target read address is not equal to or less than the first index value, the FTL 2150 may check whether the value of the target read address is less than the second index value. That is, the FTL 2150 may check whether the value of the target read address is greater than the first index value and is less than the second index value. When the value of the target read address is greater than the first index value and is less than the second index value, this means that a program command for the program address corresponding to the target read address has been transmitted, but a program operation on the program address corresponding to the target read address has not yet been completed. Therefore, the FTL 2150 may perform a barrier operation on the target read address. That is, the FTL 2150 may place the host read request corresponding to the target read address on hold until the program operation on the program address corresponding to the target read address is completed.

For example, in FIG. 12, since the target read address ADD 4 is greater than the first index value ADD 2 and is less than the second index value ADD 6, the FTL 2150 may perform a barrier operation on the target read address ADD 4.

Figure 13:
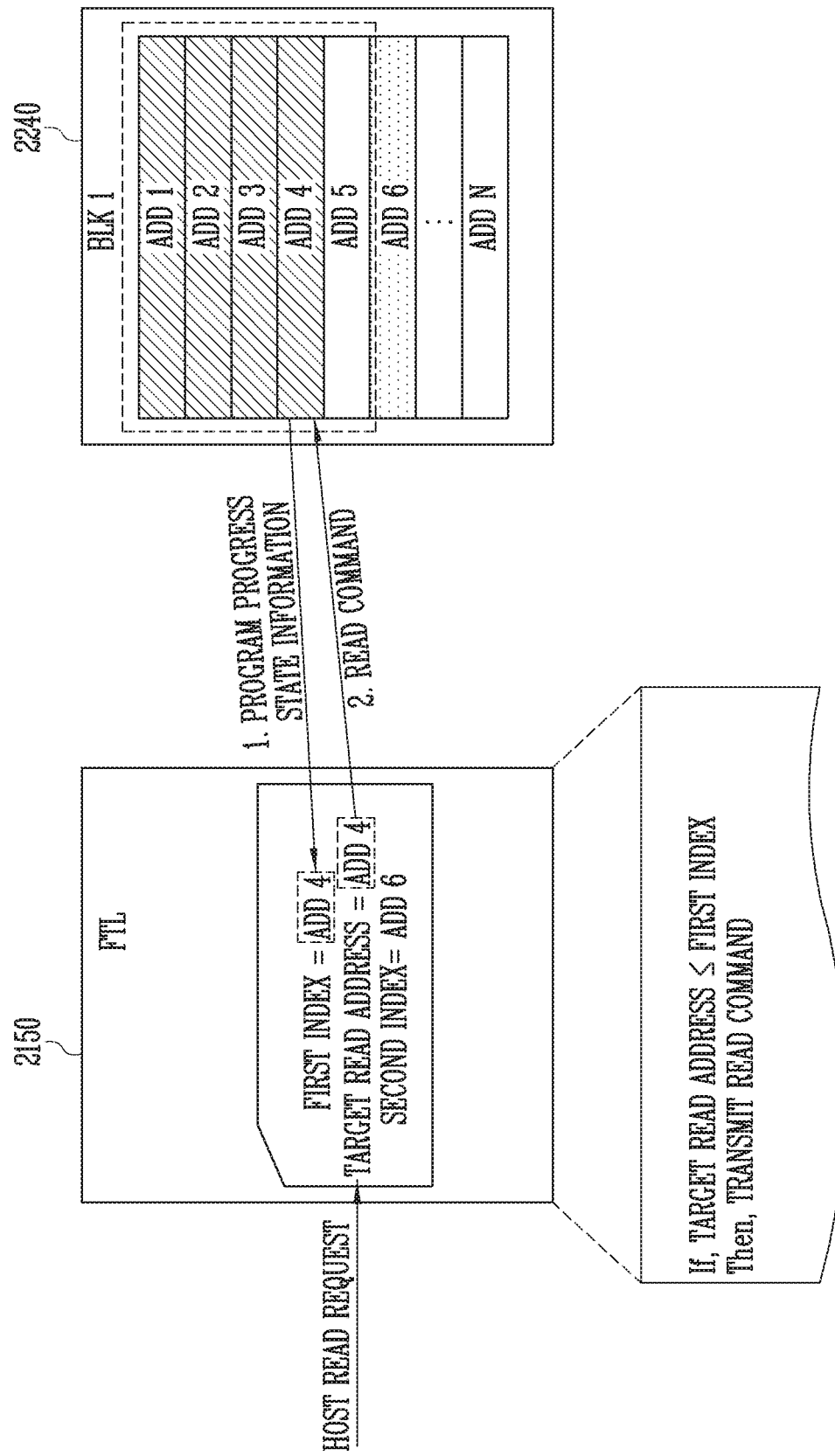
FIG. 13 is an exemplary diagram illustrating an operation performed by the flash translation layer after a barrier operation is performed on a target read address, according to an embodiment of the present disclosure.

FIG. 13 is an exemplary diagram illustrating an operation performed by the FTL, for example the FTL 2150 shown in FIG. 3, after the barrier operation is performed on the target read address.

The embodiment described with reference to FIG. 13 illustrates a case after the operation described with reference to FIG. 12 is performed.

In the embodiment described with reference to FIG. 13, it is assumed that, after the barrier operation on the target read address ADD 4 is performed, program progress state information indicating that a program operation on the program address ADD 4 corresponding to the barrier-operated target read address ADD 4 has been completed is received.

As described above, when program progress state information is received after the program command for the program addresses ADD 1 to ADD 5 is transmitted to the memory device, the FTL 2150 may update the first index value with reference to the program progress state information. Therefore, in the embodiment shown in FIG. 13, the FTL 2150 may update the first index value as the address 4 ADD 4.

Subsequently, the FTL may check whether the value of the barrier-operated target read address is equal to or less than the first index value. As described above, when the value of the target read address is equal to or less than the first index value, this means that a program operation on a program address corresponding to the target read address is completed. Therefore, when the value of the barrier-operated target read address is equal to or less than the first index value, the FTL 2150 may generate and output a read command such that a read operation on the barrier-operated target read address can be performed.

For example, in FIG. 13, since the barrier-operated target read address ADD 4 is equal to the first index value ADD 4, the FTL 2150 may generate and output a read command for the barrier-operated target read address ADD 4.

Figure 14:
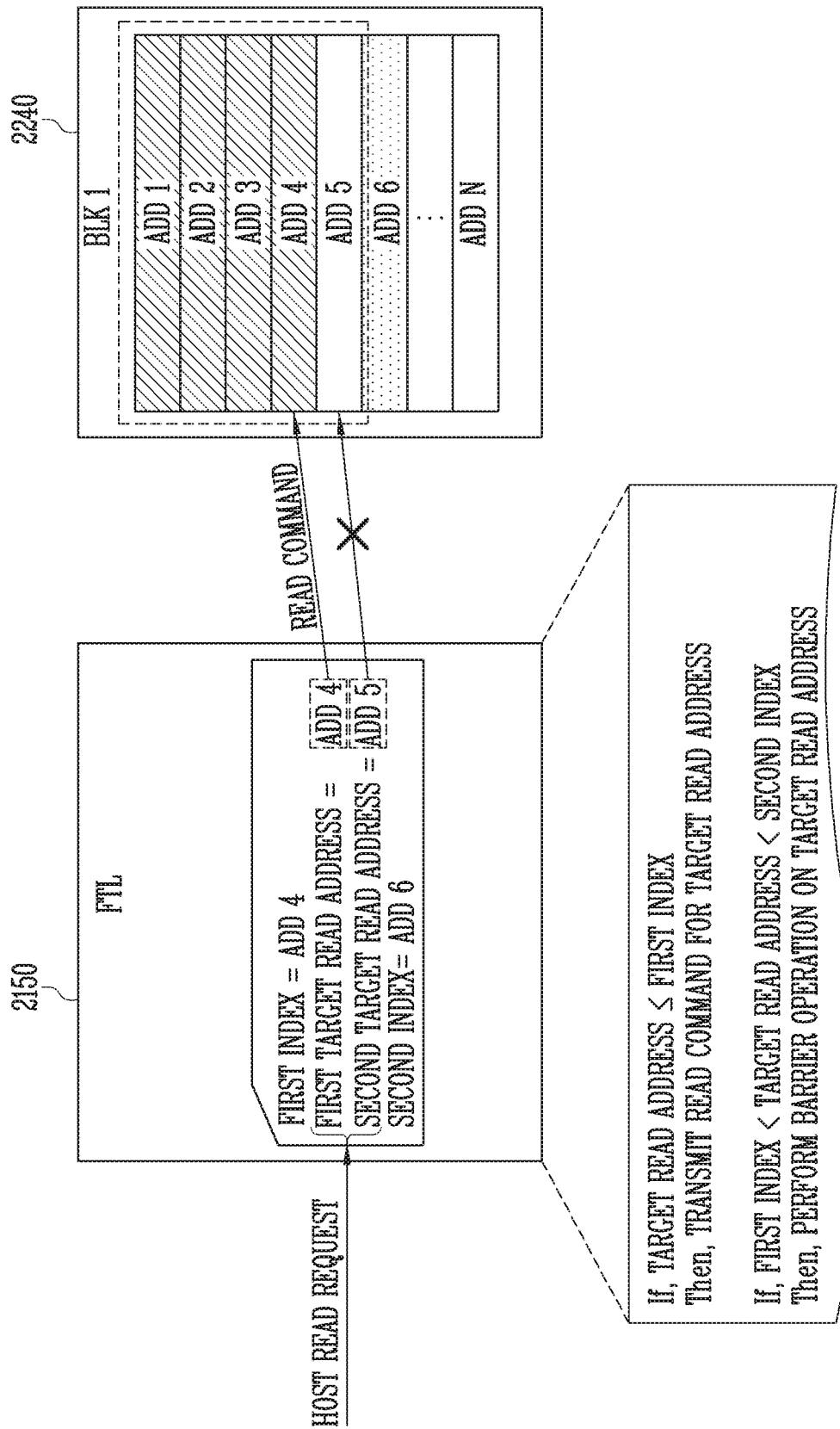
FIG. 14 is another exemplary diagram illustrating the operation performed by the flash translation layer when the host read request is received after the program command is transmitted, according to an embodiment of the present disclosure.

FIG. 14 is another exemplary diagram illustrating the operation performed by the FTL, for example the FTL 2150 shown in FIG. 3, when the host read request is received after the program command is transmitted.

In the embodiment described with reference to FIG. 14, it is assumed that the program command for the program addresses ADD 1 to ADD 5 is transmitted to the memory device 2200 in response to the host program request. Therefore, the second index value is set to the address 6 ADD 6. In addition, a case where it is determined that a program operation on the program addresses ADD 1 to ADD 4 has been completed is assumed. The first index value is updated as the address 4 ADD 4.

It is assumed that a host read request has been received based on the assumptions made above, logical addresses included in the host read request corresponds to a first target read address ADD 4 and a second target read address ADD 5.

When a plurality of target read addresses correspond to the host read request, the FTL 2150 may sequentially control a read operation on the plurality of target read addresses. That is, the FTL 2150 may control the operation by sequentially comparing the values of the plurality of target read addresses with the first index value and the second index value. When the value of a particular target read address is equal to or less than the first index value, the FTL 2150 may generate and output a read command such that a read operation on the particular target read address can be performed. When the value of a particular target read address is greater than the first index value and is less than the second index value, the FTL 2150 may perform a barrier operation on the particular target read address.

For example, in FIG. 14, the FTL 2150 may first check whether the first target read address ADD 4 is equal to or less than the first index value ADD 4. Since, the first target address ADD 4 is equal to the first index value ADD 4, the FTL 2150 may generate and output a read command for the first target read address ADD 4.

Subsequently, the FTL 2150 may check whether the value of the second target read address ADD 5 is equal to or less than the first index value ADD 4. Since the second target read address ADD 5 is greater than the first index value ADD 4 but is less than the second index value, the FTL 2150 may perform a barrier operation on the second target read address ADD 5.

Figure 15:
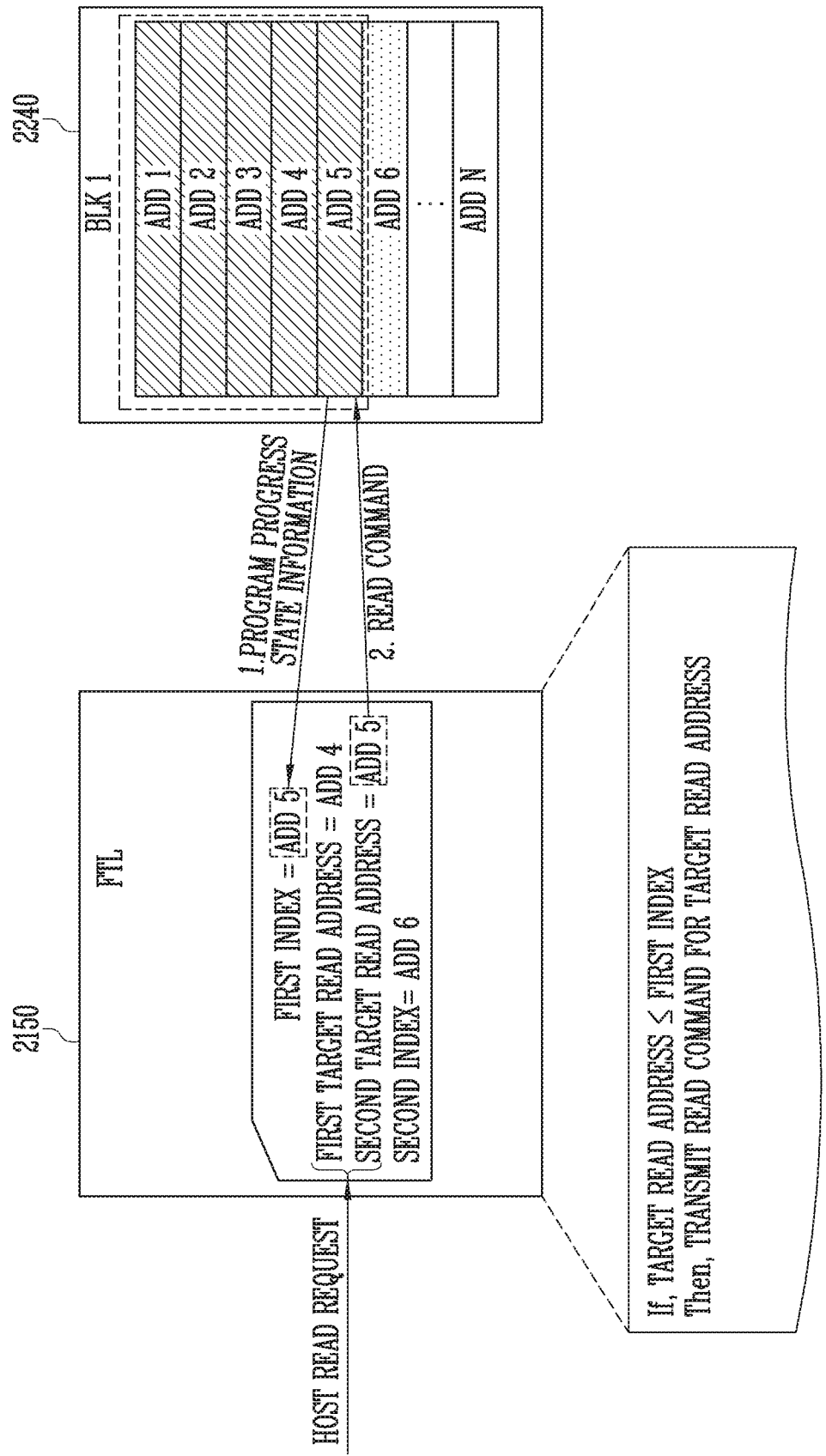
FIG. 15 is another exemplary diagram illustrating the operation performed by the flash translation layer after the barrier operation is performed on the target read address, according to an embodiment of the present disclosure.

FIG. 15 is another exemplary diagram illustrating the operation performed by the FTL, for example the FTL 2150 shown in FIG. 3, after the barrier operation is performed on the target read address.

The embodiment described with reference to FIG. 15 illustrates a case after the operation described with reference to FIG. 14 is performed. That is, the embodiment described with reference to FIG. 15 illustrates a case after the read command for the first target read address ADD 4 corresponding to the host read request is transmitted, and the barrier operation on the second target read address ADD 5 corresponding to the host read request is performed.

In the embodiment described with reference to FIG. 15, it is assumed that program progress state information indicating that a program operation on a program address ADD 5 corresponding to the barrier-operated second target address ADD 5 has been completed is received.

As described above, when program progress state information is received after the program command for the program addresses ADD 1 to ADD 5 is transmitted to the memory device, the FTL 2150 may update the first index value with reference to the program progress state information. Therefore, in the embodiment shown in FIG. 15, the FTL 2150 may update the first index value as the address 5 ADD 5.

Subsequently, the FTL may check whether the value of the barrier-operated second target read address ADD 5 is equal to or less than the first index value ADD 5. When the value of the barrier-operated second target read address ADD 5 is equal to or less than the first index value ADD 5, the FTL 2150 may generate and output a read command for the barrier-operated second target read address.

For example, in FIG. 15, since the barrier-operated second target read address ADD 5 is equal to the first index value ADD 5, the FTL 2150 may generate and output a read command for the barrier-operated second target read address ADD 5.

Figure 16:
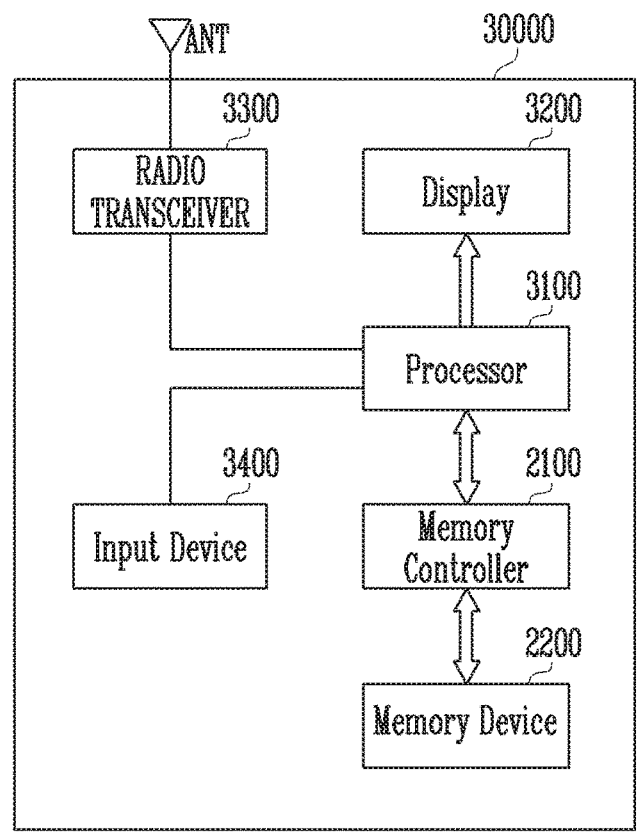
FIGS. 16 to 19 are diagrams illustrating various application examples of the memory system including the memory controller shown in FIGS. 1 and 2.

FIG. 16 is a diagram illustrating an application example of the memory system including the memory controller shown in FIGS. 1 and 2.

Referring to FIG. 16, the memory system 30000 may be implemented as a cellular phone, a smart phone, a tablet PC, a personal digital assistant (PDA), or a wireless communication device. The memory system 30000 may include a memory device 2200 and a memory controller 2100 capable of controlling an operation of the memory device 2200.

The memory controller 2100 may control a data access operation of the memory device 2200, e.g., a program operation, an erase operation, a read operation, or the like under the control of a processor 3100.

Data programmed in the memory device 2200 may be output through a display 3200 under the control of the memory controller 2100.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 2100 or the display 3200. The memory controller 2100 may transmit the signal processed by the processor 3100 to the memory device 2200. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 2100, data output from the radio transceiver 3300, or data output from the input device 3400 can be output through the display 3200.

In some embodiments, the memory controller 2100 capable of controlling an operation of the memory device 2200 may be implemented as a part of the processor 3100, or be implemented as a chip separate from the processor 3100.

Figure 17:
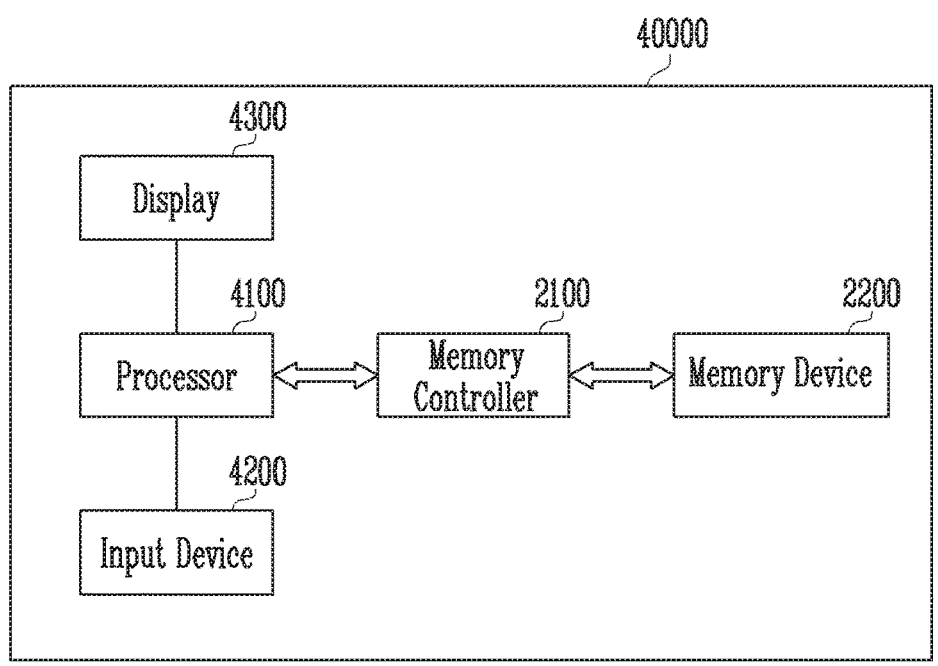

FIG. 17 is a diagram illustrating another application example of the memory system including the memory controller shown in FIGS. 1 and 2.

Referring to FIG. 17, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 2200 and a memory controller 2100 capable of controlling a data processing operation of the memory device 2200.

A processor 4100 may output data stored in the memory device 2200 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 2100. In some embodiments, the memory controller 2100 capable of controlling an operation of the memory device 2200 may be implemented as a part of the processor 4100, or be implemented as a chip separate from the processor 4100.

Figure 18:
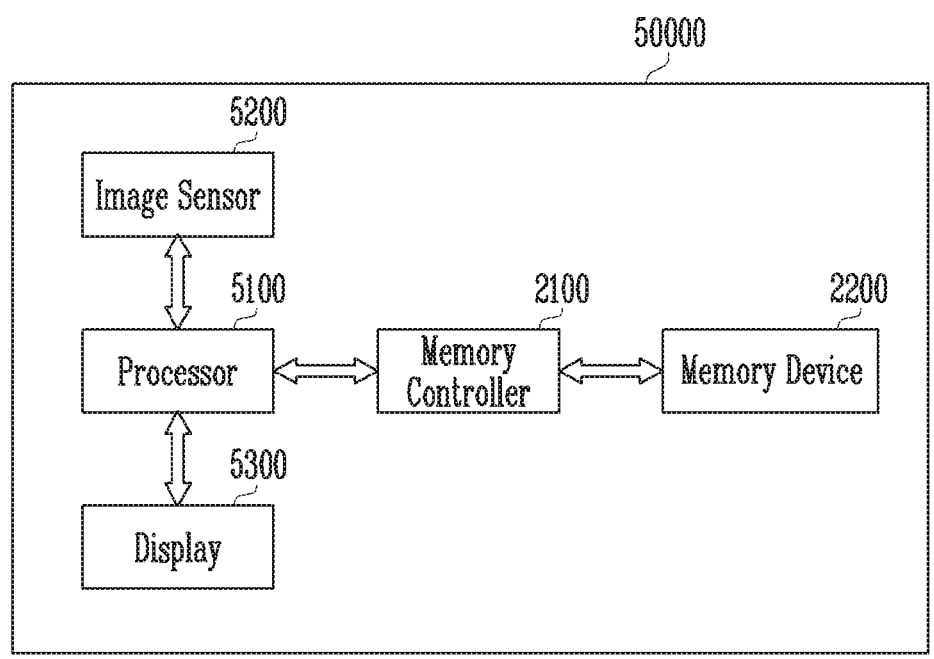

FIG. 18 is a diagram illustrating another application example of the memory system including the memory controller shown in FIGS. 1 and 2.

Referring to FIG. 18, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 2200 and a memory controller 2100 capable of controlling a data processing operation of the memory device 2200, e.g., a program operation, an erase operation, or a read operation.

An image sensor 5200 of the memory system 50000 may convert an optical image into digital signals, and the converted digital signals may be transmitted to a processor 5100 or the memory controller 2100. Under the control of the processor 5100, the converted digital signals may be output through a display 5300, or be stored in the memory device 2200 through the memory controller 2100. In addition, data stored in the memory device 2200 may be output through the display 5300 under the control of the processor 5100 or the memory controller 2100.

In some embodiments, the memory controller 2100 capable of controlling an operation of the memory device 2200 may be implemented as a part of the processor 5100, or be implemented as a chip separate from the processor 5100.

Figure 19:
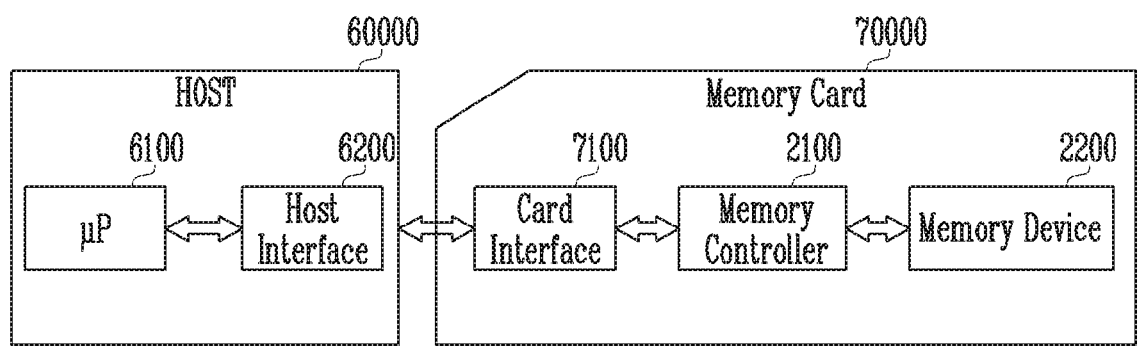

FIG. 19 is a diagram illustrating another application example of the memory system including the memory controller shown in FIGS. 1 and 2.

Referring to FIG. 19, the memory system 70000 may be implemented as a memory card or a smart card. The memory system 70000 may include a memory device 2200, a memory controller 2100, and a card interface 7100.

The memory controller 2100 may control data exchange between the memory device 2200 and the card interface 7100. In some embodiments, the card interface 7100 may be a Secure Digital (SD) card interface or a Multi-Media Card (MMC) interface, but the present disclosure is not limited thereto.

The card interface 7100 may interface data exchange between a host 60000 and the memory controller 2100 according to a protocol of the host 60000. In some embodiments, the card interface 7100 may support a Universal Serial Bus (USB) protocol and an Inter-Chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 2200 through the card interface 7100 and the memory controller 2100 under the control of a microprocessor (μP) 6100.

According to the present disclosure, whether a barrier operation on a read request received from the host is to be performed can be determined according to a specific progress state of a program operation. Thus, the frequency of the barrier operation can be decreased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An operating method of a memory controller, the method comprising:
    transmitting a program command and a plurality of program addresses to a memory device in response to a host program request;
    storing a first address corresponding to an address of a program operation completed the most recently among the plurality of program addresses;
    storing a second address at which a next program operation is to be performed, the second address not being among the plurality of program addresses;
    checking, when a target read address corresponding to a host read request is included in the plurality of program addresses, a program progress state for a program address corresponding to the target read address among the plurality of program addresses; and
    controlling a read operation on the target read address based on a comparison result of the target read address with the first address and the second address.

2. The method of claim 1, wherein the controlling of the read operation includes transmitting, when a value of the target read address is equal to or less than a value of the first address, a read command for the target read address to the memory device.

3. The method of claim 1, wherein the controlling of the read operation includes performing, when a value of the target read address is greater than a value of the first address and is less than a value of the second address, a barrier operation on the target read address.

4. The method of claim 3, further comprising:
    checking a program progress state for a program address corresponding to the target read address on which the barrier operation is performed; and
    transmitting to the memory device, when a program operation on the program address corresponding to the target read address on which the barrier operation is performed is completed, a read command for the target read address on which the barrier operation is performed.

5. The method of claim 1, further comprising:
    transmitting to the memory device a command for requesting program progress state information on the plurality of program addresses; and
    receiving the program progress state information on the plurality of program addresses from the memory device.

6. A memory controller comprising:
a host interface layer configured to receive a host program request and a host read request;
a flash translation layer configured to generate and output a program command and a plurality of program addresses in response to the host program request, store a first address corresponding to an address of a program operation completed the most recently among the plurality of program addresses, store a second address at which a next program operation is to be performed, the second address not being among the plurality of program addresses, check a program progress state for a program address corresponding to a target read address when the target read address corresponding to the host read request is included in the plurality of program addresses, and control a read operation on the target read address based on a comparison result of the target read address with the first address and the second address; and
a flash interface layer configured to transmit a command and addresses, which are output from the flash translation layer, to a memory device.

7. The memory controller of claim 6, wherein the flash translation layer generates and outputs, when a value of the target read address is equal to or less than a value of the first address, a read command for the target read address.

8. The memory controller of claim 6, wherein the flash translation layer performs, when a value of the target read address is greater than a value of the first address and is less than a value of the second address, a barrier operation on the target read address.

9. The memory controller of claim 8, wherein the flash translation layer generates and outputs, when a program operation on a program address corresponding to the target read address on which the barrier operation is performed is completed, a read command for the target read address on which the barrier operation is performed.

10. The memory controller of claim 6, wherein the flash translation layer generates and outputs a command for requesting program progress state information on the plurality of program addresses, and receives the program progress state information on the plurality of program addresses from the memory device.

11. A memory controller comprising:
a first index storage configured to store an address at which a program operation is completed among a plurality of addresses corresponding to a host program request;
a second index storage configured to store a start address to be used in a next host program request; and
a host request processor configured to control a read operation corresponding to a host read request based on a comparison result of a target read address with the address stored in the first index storage and the start address stored in the second index storage.

12. The memory controller of claim 11, wherein the host request processor transmits, when a value of the target read address is equal to or less than a value of the address stored in the first index storage, a read command for the target read address to a memory device.

13. The memory controller of claim 11, wherein the host request processor delays, when a value of the target read address is greater than a value of the address stored in the first index storage and is less than a value of the start address stored in the second index storage, generation of a read command for the target read address.

14. The memory controller of claim 11, wherein the host request processor receives program progress state information on the plurality of addresses from a memory device, and updates the address stored in the first index storage, based on the received program progress state information.

15. The memory controller of claim 11, wherein the host request processor transmits to a memory device a command for requesting program progress state information on the plurality of addresses.

* * * * *